(12) United States Patent
Peng et al.

(10) Patent No.: US 9,706,592 B2
(45) Date of Patent: Jul. 11, 2017

(54) DATA TRANSMISSION METHOD, TERMINAL, AND DATA TRANSMISSION METHOD SYSTEM

(71) Applicant: Huawei Device Co., Ltd., Shenzhen (CN)

(72) Inventors: Xu Peng, Shanghai (CN); Jianglin Gu, Shenzhen (CN); Rui Sun, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 15/033,545

(22) PCT Filed: Nov. 1, 2013

(86) PCT No.: PCT/CN2013/086403
§ 371 (c)(1),
(2) Date: Apr. 29, 2016

(87) PCT Pub. No.: WO2015/062064
PCT Pub. Date: May 7, 2015

(65) Prior Publication Data
US 2016/0286589 A1    Sep. 29, 2016

(51) Int. Cl.
H04W 76/02   (2009.01)
H04W 48/18   (2009.01)
H04W 4/00    (2009.01)

(52) U.S. Cl.
CPC ......... *H04W 76/023* (2013.01); *H04W 4/008* (2013.01); *H04W 48/18* (2013.01)

(58) Field of Classification Search
CPC .................................................. H04W 76/023
See application file for complete search history.

(56) References Cited

U.S. PATENT DOCUMENTS 4,713,613 A * 12/1987 Takahashi .......... G01D 5/24438
324/207.21
6,493,550 B1    12/2002 Raith
(Continued)

FOREIGN PATENT DOCUMENTS

CN    1326661 A    12/2001
CN    102396271 A    3/2012
(Continued)

OTHER PUBLICATIONS

Allegro Microsystems, et al., "A1360, A1361, and A1362: Low-Noise Programmable Linear Hall Effect Sensor ICs with Adjustable Bandwidth (50 kHz Maximum) and Analog Output,"Internet Citation, XP002678533, Retrieved from the Internet: URL: http://www.allegromicro.com/en/Products/Current-Sensor-ICs/SIP-Package-Zero-To-Thousand-Amp-Sensor-ICs/A1360-1-2.aspx [retrieved on Jun. 25, 2012], Dec. 31, 2009, 25 pages.
(Continued)

*Primary Examiner* — Tuan H Nguyen
(74) *Attorney, Agent, or Firm* — Conley Rose, P.C.

(57) ABSTRACT

A data transmission method, where the data transmission method includes acquiring, by a first terminal, an output signal of a sensor of the first terminal, where the output signal of the sensor of the first terminal is a signal generated when a first magnet of a second terminal triggers the sensor of the first terminal, determining, by the first terminal, the output signal of the sensor of the first terminal as a low-level output signal, establishing, by the first terminal, a communication link with the second terminal, and determining, by the first terminal according to the communication link established by the first terminal with the second terminal, to perform data transmission with the second terminal.

14 Claims, 14 Drawing Sheets

(56) References Cited

U.S. PATENT DOCUMENTS

| | | | |
|---|---|---|---|
| 2010/0261510 A1 | 10/2010 | Rajamani et al. | |
| 2011/0070837 A1* | 3/2011 | Griffin | H04B 5/0062 |
| | | | 455/41.3 |
| 2013/0076531 A1* | 3/2013 | San Vicente | A61B 5/0015 |
| | | | 340/870.02 |
| 2014/0159839 A1 | 6/2014 | Kim | |

FOREIGN PATENT DOCUMENTS

| | | |
|---|---|---|
| CN | 203039746 U | 7/2013 |
| EP | 1879364 A1 | 1/2008 |
| WO | 2013025030 A2 | 2/2013 |

OTHER PUBLICATIONS

Foreign Communication From a Counterpart Application, European Application No. 13896683.3, Extended European Search Report dated Sep. 22, 2016, 8 pages.

Foreign Communication From a Counterpart Application, PCT Application No. PCT/CN2013/086403, English Translation of International Search Report dated Jul. 28, 2014, 3 pages.

Foreign Communication From a Counterpart Application, PCT Application No. PCT/CN2013/086403, English Translation of Written Opinion dated Jul. 28, 2014, 8 pages.

* cited by examiner

DATA TRANSMISSION METHOD, TERMINAL, AND DATA TRANSMISSION METHOD SYSTEM

CROSS-REFERENCE TO RELATED APPLICATION

This application is a U.S. National Stage of International Application No. PCT/CN2013/086403, filed on Nov. 1, 2013, which is hereby incorporated by reference in its entirety.

TECHNICAL FIELD

The present disclosure relates to the field of data processing technologies, and in particular, to a data transmission method, a terminal, and a data transmission system.

BACKGROUND

At present, when performing data transmission, a user needs to perform a cumbersome operation to establish a connection between two parties of the data transmission. For example, when BLUETOOTH is used to transmit data, both a data sender and a data receiver enter a setting interface of a device and enable BLUETOOTH. Then the data sender further needs to search for a device of the data receiver by means of BLUETOOTH. When the search succeeds, a connection process is complete.

However, in the prior art, in a process of establishing the connection between the two parties of the data transmission, the cumbersome operation performed by the user is relatively cumbersome, which takes relatively long time, prolongs data transmission time, and leads to poor user experience.

SUMMARY

In view of this, embodiments of the present disclosure provide a data transmission method, a terminal, and a data transmission system in order to resolve a problem in an existing data transmission method that data transmission time is prolonged because relatively long time is taken due to a cumbersome user operation.

To achieve the foregoing objectives, the following solutions are proposed.

A first aspect of an embodiment of the present disclosure provides a data transmission method, including acquiring, by a first terminal, an output signal of a sensor of the first terminal, where the output signal of the sensor of the first terminal is a signal generated when a first magnet of a second terminal triggers the sensor of the first terminal, determining, by the first terminal, the output signal of the sensor of the first terminal as a low-level output signal, establishing, by the first terminal, a communication link with the second terminal when the output signal of the sensor of the first terminal is the low-level output signal, and determining, by the first terminal according to the communication link established by the first terminal with the second terminal, to perform data transmission with the second terminal.

In a first implementation manner of the first aspect of the embodiment of the present disclosure, establishing, by the first terminal, a communication link with the second terminal includes establishing, by the first terminal, the communication link with the second terminal in a BLUETOOTH data transmission manner.

In a first implementation manner of the first aspect of the embodiment of the present disclosure, establishing, by the first terminal, a communication link with the second terminal includes establishing, by the first terminal, the communication link with the second terminal in a WiFi data transmission manner.

In a second implementation manner of the first aspect of the embodiment of the present disclosure, after the establishing, by the first terminal, the communication link with the second terminal in a BLUETOOTH data transmission manner, the method further includes acquiring, by the first terminal, a storage space occupancy value of to-be-transmitted data, where the to-be-transmitted data is to-be-transmitted data obtained when the first terminal determines to perform the data transmission with the second terminal, determining, by the first terminal, that the storage space occupancy value is greater than a preset threshold, and establishing, by the first terminal, the communication link with the second terminal in a WiFi data transmission manner when the storage space occupancy value is greater than the preset threshold, where determining, by the first terminal according to the communication link established by the first terminal with the second terminal, to perform data transmission with the second terminal includes determining, by the first terminal according to the communication link established by the first terminal with the second terminal in the WiFi data transmission manner, to perform the data transmission with the second terminal.

In the first implementation manner of the first aspect of the embodiment of the present disclosure, in the second implementation manner of the first aspect, in a third implementation manner of the first aspect, or in a fourth implementation manner of the first aspect, before establishing, by the first terminal, a communication link with the second terminal, the method further includes determining, by the first terminal, that the low-level output signal of the sensor of the first terminal meets a first preset requirement, where the first preset requirement is that a pole N of the first magnet of the second terminal triggers the sensor of the first terminal to generate the low-level output signal.

In the first implementation manner of the first aspect of the embodiment of the present disclosure, in the second implementation manner of the first aspect, in a third implementation manner of the first aspect, or in a fourth implementation manner of the first aspect, before establishing, by the first terminal, a communication link with the second terminal, the method further includes determining, by the first terminal, that the low-level output signal of the sensor of the first terminal meets a second preset requirement, where the second preset requirement is that a pole S of the first magnet of the second terminal triggers the sensor of the first terminal to generate the low-level output signal.

In a sixth implementation manner of the first aspect of the embodiment of the present disclosure, the first terminal further includes a second magnet, and the second magnet is disposed on a jacket of the first terminal.

In a seventh implementation manner of the first aspect of the embodiment of the present disclosure, the data transmission method further includes determining, by the first terminal, that the low-level output signal of the sensor of the first terminal does not meet the second preset requirement, determining, by the first terminal, that the low-level output signal of the sensor of the first terminal meets a third preset requirement, where the third preset requirement is that the second magnet of the first terminal triggers, when approaching the sensor of the first terminal because the jacket of the first terminal is closed, the sensor of the first terminal to generate the low-level output signal, and controlling, by the first terminal when the low-level output signal of the sensor of the first terminal meets the third preset requirement, a screen of the first terminal to enter a screen locking state.

In the seventh implementation manner of the first aspect of the embodiment of the present disclosure or in an eighth implementation manner of the first aspect of the embodiment of the present disclosure, after acquiring, by a first terminal, an output signal of a sensor of the first terminal, the method further includes determining, by the first terminal, the output signal of the sensor of the first terminal as a high-level output signal, where the high-level output signal is a signal generated by triggering the sensor of the first terminal when the second magnet of the first terminal is far from the sensor of the first terminal because the jacket of the first terminal is open, and controlling, by the first terminal, the screen of the first terminal to enter a screen unlocking state.

A second aspect of an embodiment of the present disclosure provides a terminal, including a first magnet, a sensor, a processor, and a memory, where the sensor is configured to be triggered by a first magnet of a second terminal to generate an output signal, the memory is configured to store a program, the processor is configured to execute the program stored by the memory, acquire the output signal of the sensor, determine the output signal of the sensor as a low-level output signal, when the output signal of the sensor is the low-level output signal, control the terminal to establish a communication link with the second terminal, and control, according to the communication link established by the terminal with the second terminal, the terminal to determine to perform data transmission with the second terminal.

In a first implementation manner of the second aspect of the embodiment of the present disclosure, that the processor controls the terminal to establish the communication link with the second terminal includes controlling, by the processor, the terminal to establish the communication link with the second terminal in a BLUETOOTH data transmission manner.

In a first implementation manner of the second aspect of the embodiment of the present disclosure, that the processor controls the terminal to establish the communication link with the second terminal includes controlling, by the processor, the terminal to establish the communication link with the second terminal in a WiFi data transmission manner.

In a second implementation manner of the second aspect of the embodiment of the present disclosure, after controlling, by the processor, the terminal to establish the communication link with the second terminal in a BLUETOOTH data transmission manner, the processor is further configured to acquire a storage space occupancy value of to-be-transmitted data, where the to-be-transmitted data is to-be-transmitted data obtained when the terminal determines to perform the data transmission with the second terminal, determine that the storage space occupancy value is greater than a preset threshold, and control the terminal to establish the communication link with the second terminal in a WiFi data transmission manner when the storage space occupancy value is greater than the preset threshold, where controlling, according to the communication link established by the terminal with the second terminal, the terminal to determine to perform data transmission with the second terminal includes controlling, by the processor according to the communication link established by the terminal with the second terminal in the WiFi data transmission manner, the terminal to determine to perform the data transmission with the second terminal.

In the first implementation manner of the second aspect of the embodiment of the present disclosure, in the second implementation manner of the second aspect, in a third implementation manner of the second aspect, or in a fourth implementation manner of the second aspect, before the processor controls the terminal to establish the communication link with the second terminal, the processor is further configured to control the terminal to determine that the low-level output signal of the sensor of the terminal meets a first preset requirement, where the first preset requirement is that a pole N of the first magnet of the second terminal triggers the sensor of the terminal to generate the low-level output signal.

In the first implementation manner of the second aspect of the embodiment of the present disclosure, in the second implementation manner of the second aspect, in a third implementation manner of the second aspect, or in a fourth implementation manner of the second aspect, before the processor controls the terminal to establish the communication link with the second terminal, the processor is further configured to control the terminal to determine that the low-level output signal of the sensor of the terminal meets a second preset requirement, where the second preset requirement is that a pole S of the first magnet of the second terminal triggers the sensor of the terminal to generate the low-level output signal.

In a sixth implementation manner of the second aspect of the embodiment of the present disclosure, the terminal further includes a second magnet, and the second magnet is disposed on a jacket of the terminal, where the sensor is further configured to be triggered by a second magnet of the first terminal to generate an output signal.

In a seventh implementation manner of the second aspect of the embodiment of the present disclosure, the processor is further configured to determine that the low-level output signal of the sensor of the terminal does not meet the second preset requirement, determine that the low-level output signal of the sensor of the terminal meets a third preset requirement, where the third preset requirement is that the second magnet of the first terminal triggers, when approaching the sensor of the first terminal because the jacket of the first terminal is closed, the sensor of the first terminal to generate the low-level output signal, and when the low-level output signal of the sensor of the terminal meets the third preset requirement, control a screen of the terminal to enter a screen locking state.

In the seventh implementation manner of the second aspect of the embodiment of the present disclosure, or in an eighth implementation manner of the second aspect of the embodiment of the present disclosure, the processor is further configured to determine the output signal of the sensor of the terminal as a high-level output signal, where the high-level output signal is a signal generated by triggering the sensor of the first terminal when the second magnet of the first terminal is far from the sensor of the first terminal because the jacket of the first terminal is open, and control the screen of the terminal to enter a screen unlocking state.

A third aspect of an embodiment of the present disclosure provides a data transmission system, including a first terminal and a second terminal, where both the first terminal and the second terminal are equipped with a sensor and a first magnet, where the first terminal is configured to acquire an output signal of the sensor of the first terminal, where the output signal of the sensor of the first terminal is a signal generated when the first magnet of the second terminal triggers the sensor of the first terminal, determine the output signal of the sensor of the first terminal as a low-level output signal, establish a communication link with the second terminal, and determine, according to the communication link established by the first terminal with the second terminal, to perform data transmission with the second terminal, and the second terminal is configured to acquire an output signal of the sensor of the second terminal, where the output signal of the sensor of the second terminal is a signal generated when the first magnet of the first terminal triggers the sensor of the second terminal, determine the output signal of the sensor of the second terminal as a low-level output signal, establish a communication link with the first terminal, and determine, according to the communication link established by the second terminal with the first terminal, to perform data transmission with the first terminal.

In a first implementation manner of the third aspect of the embodiment of the present disclosure, a manner in which the first terminal establishes the communication link with the second terminal includes sending, by the first terminal, a BLUETOOTH connection request to the second terminal, and a manner in which the second terminal establishes the communication link with the first terminal includes receiving and responding to, by the second terminal, the BLUETOOTH connection request sent by the first terminal.

In a first implementation manner of the third aspect of the embodiment of the present disclosure, a manner in which the second terminal establishes the communication link with the first terminal includes sending, by the second terminal, a BLUETOOTH connection request to the first terminal, and a manner in which the first terminal establishes the communication link with the second terminal includes receiving and responding to, by the first terminal, the BLUETOOTH connection request sent by the second terminal.

In a first implementation manner of the third aspect of the embodiment of the present disclosure, a manner in which the first terminal establishes the communication link with the second terminal includes sending, by the first terminal, a network access request to a preset server, and a manner in which the second terminal establishes the communication link with the first terminal includes sending, by the second terminal, a network access request to the preset server.

In a second implementation manner of the third aspect of the embodiment of the present disclosure or in a third implementation manner of the third aspect, the first terminal is further configured to acquire a storage space occupancy value of to-be-transmitted data, where the to-be-transmitted data is to-be-transmitted data obtained when the first terminal determines to perform the data transmission with the second terminal, determine that the storage space occupancy value is greater than a preset threshold, and send a network access request to a preset server, where that the first terminal determines, according to the communication link established by the first terminal with the second terminal, to perform the data transmission with the second terminal includes performing, by the first terminal in a manner of forwarding to-be-transmitted data to the second terminal by the preset server, the data transmission with the second terminal, and the second terminal is further configured to when the first terminal determines that the storage space occupancy value is greater than the preset threshold, send a network access request to the preset server, where that the second terminal determines, according to the communication link established by the second terminal with the first terminal, to perform the data transmission with the first terminal includes performing, by the second terminal in a manner of forwarding to-be-transmitted data to the first terminal by the preset server, the data transmission with the first terminal.

In a second implementation manner of the third aspect of the embodiment of the present disclosure or in a third implementation manner of the third aspect, the second terminal is further configured to acquire a storage space occupancy value of to-be-transmitted data, where the to-be-transmitted data is to-be-transmitted data obtained when the second terminal determines to perform the data transmission with the first terminal, determine that the storage space occupancy value is greater than a preset threshold, and send a network access request to a preset server, where that the second terminal determines, according to the communication link established by the second terminal with the first terminal, to perform the data transmission with the first terminal includes performing, by the second terminal in a manner of forwarding to-be-transmitted data to the first terminal by the preset server, the data transmission with the first terminal, and the first terminal is further configured to when the second terminal determines that the storage space occupancy value is greater than the preset threshold, send a network access request to the preset server, where that the first terminal determines, according to the communication link established by the first terminal with the second terminal, to perform the data transmission with the second terminal includes performing, by the first terminal in a manner of forwarding to-be-transmitted data to the second terminal by the preset server, the data transmission with the second terminal.

In the first implementation manner of the third aspect of the embodiment of the present disclosure, in the second implementation manner of the third aspect, in the third implementation manner of the third aspect, or in a fourth implementation manner of the third aspect, before establishing the communication link with the second terminal, the first terminal is further configured to determine that the low-level output signal of the sensor of the first terminal meets a first preset requirement, where the first preset requirement is that a pole N of the first magnet of the second terminal triggers the sensor of the first terminal to generate the low-level output signal, and before establishing the communication link with the first terminal, the second terminal is further configured to determine that the low-level output signal of the sensor of the second terminal meets a third preset requirement, where the third preset requirement is that a pole N of the first magnet of the first terminal triggers the sensor of the second terminal to generate the low-level output signal.

In the first implementation manner of the third aspect of the embodiment of the present disclosure, in the second implementation manner of the third aspect, in the third implementation manner of the third aspect, or in a fourth implementation manner of the third aspect, before establishing the communication link with the second terminal, the first terminal is further configured to determine that the low-level output signal of the sensor of the first terminal meets a second preset requirement, where the second preset requirement is that a pole S of the first magnet of the second terminal triggers the sensor of the first terminal to generate the low-level output signal, and before establishing the communication link with the first terminal, the second terminal is further configured to determine that the low-level output signal of the sensor of the second terminal meets a fourth preset requirement, where the fourth preset requirement is that a pole S of the first magnet of the first terminal triggers the sensor of the second terminal to generate the low-level output signal.

In an eighth implementation manner of the third aspect of the embodiment of the present disclosure, the first terminal further includes a second magnet, and the second magnet is disposed on a jacket of the first terminal, where the sensor of the first terminal is further configured to be triggered by the second magnet of the first terminal to generate an output signal, and the second terminal further includes a second magnet, where the second magnet is disposed on a jacket of the second terminal, and the sensor of the second terminal is further configured to be triggered by the second magnet of the second terminal to generate an output signal.

In a ninth implementation manner of the third aspect of the embodiment of the present disclosure, the first terminal is further configured to determine that the low-level output signal of the sensor of the first terminal does not meet the second preset requirement, and determine that the low-level output signal of the sensor of the first terminal meets a fifth preset requirement, and control a screen of the first terminal to enter a screen locking state, where the fifth preset requirement is that the second magnet of the first terminal triggers, when approaching the sensor of the first terminal because the jacket of the first terminal is closed, the sensor of the first terminal to generate the low-level output signal, and the second terminal is further configured to determine that the low-level output signal of the sensor of the second terminal does not meet the fourth preset requirement, and determine that the low-level output signal of the sensor of the second terminal meets a sixth preset requirement, and control a screen of the second terminal to enter a screen locking state, where the sixth preset requirement is that the second magnet of the second terminal triggers, when approaching the sensor of the second terminal because the jacket of the second terminal is closed, the sensor of the first terminal to generate the low-level output signal.

In the ninth implementation manner of the third aspect of the embodiment of the present disclosure, or in a tenth implementation manner of the third aspect, the first terminal is further configured to determine the output signal of the sensor of the first terminal as a first high-level output signal, and control the screen of the first terminal to enter a screen unlocking state, where the first high-level output signal is generated when the second magnet of the first terminal is far from the sensor of the first terminal because the jacket of the first terminal is open, and the second terminal is further configured to determine the output signal of the sensor of the second terminal as a second high-level output signal, and control the screen of the second terminal to enter a screen unlocking state, where the second high-level output signal is a signal generated by triggering the sensor of the second terminal when the second magnet of the second terminal is far from the sensor of the second terminal because the jacket of the second terminal is open.

It can be learned from the foregoing technical solutions that, in the data transmission method disclosed in the embodiments of the present disclosure, because it is only required that a first magnet of a second terminal should trigger a sensor of a first terminal so that the sensor of the first terminal outputs a low-level output signal, the first terminal can establish a communication link with the second terminal, which simplifies a user operation such that a user does not need to perform a cumbersome operation, thereby resolving a problem in an existing data transmission method that data transmission time is prolonged because relatively long time is taken due to a cumbersome user operation.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

An embodiment of the present disclosure provides a data transmission method in order to resolve a problem in an existing data transmission method that data transmission time is prolonged because relatively long time is taken due to a cumbersome user operation.

First, it should be noted that the data transmission method disclosed in this embodiment of the present disclosure is applied to either of two terminals that need to perform data transmission, and the two terminals are both equipped with a sensor and a first magnet. A first terminal described in the following embodiments only refers to one of the two terminals that perform the data transmission. Likewise, a second terminal refers to the other. In a case of departing from a scope of the embodiment of the present disclosure, the first terminal and the second terminal may be interchanged.

Figure 1:
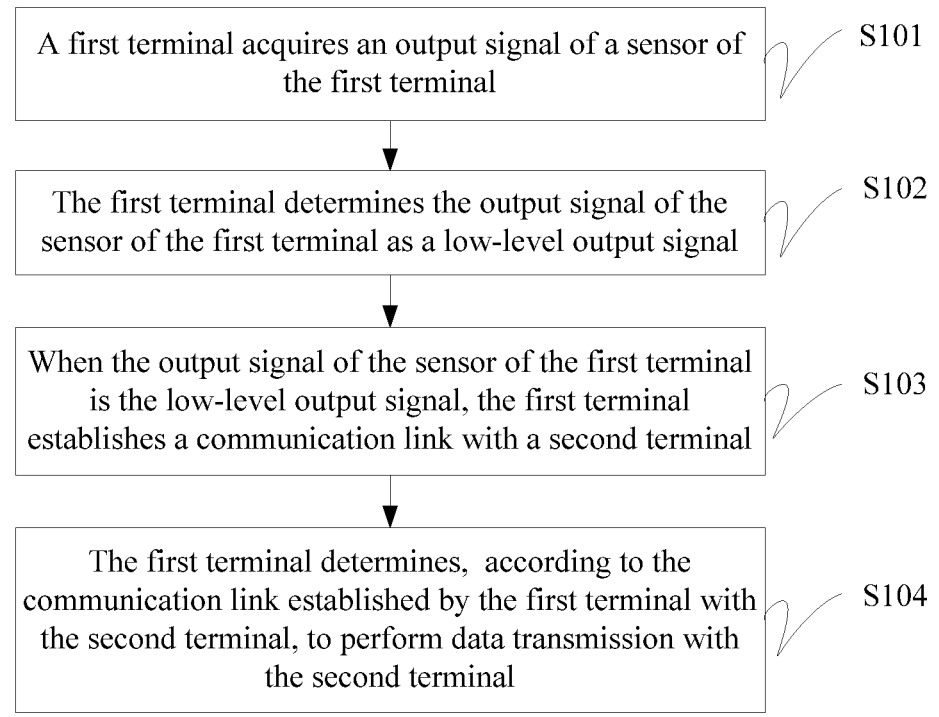
FIG. 1 is a flowchart of a data transmission method according to an embodiment of the present disclosure.

Referring to FIG. 1, a data transmission method disclosed in an embodiment of the present disclosure includes the following steps.

Step S101: A first terminal acquires an output signal of a sensor of the first terminal.

The output signal of the sensor of the first terminal is a signal generated when a first magnet of a second terminal triggers the sensor of the first terminal.

A magnetic line of a magnet may pass through the sensor, and trigger the sensor such that the sensor generates the output signal.

Step S102: The first terminal determines the output signal of the sensor of the first terminal as a low-level output signal.

In this embodiment, determining the output signal as the low-level output signal is determining whether the acquired output signal is the low-level output signal. Because two terminals are both equipped with a first magnet and a sensor, when the sensor of the first terminal is located within a scope of a magnetic line of the first magnet of the second terminal, the magnetic line may trigger the sensor, and the sensor generates and outputs the low-level output signal.

When the two terminals are far from each other, and the sensor of the first terminal is not located in the scope of the magnetic line of the first magnet of the second terminal, the output signal of the sensor is generally pulled high. In this case, the output signal of the sensor is a high-level signal.

It should be noted herein that in this embodiment, when it is determined that the output signal of the sensor is not a low-level signal, an operation may be quitted and not performed.

Step S103: When the output signal of the sensor of the first terminal is the low-level output signal, the first terminal establishes a communication link with the second terminal.

Step S104: The first terminal determines, according to the communication link established by the first terminal with the second terminal, to perform data transmission with the second terminal.

Furthermore, after a connection of the communication link between the two terminals is established, if a user performs a preset user input operation on the first terminal, that is, the user performs a data transmission operation on the first terminal, the first terminal detects the operation, that is, the first terminal determines that the data transmission needs to be performed, generates a data transmission control instruction, and controls itself to perform the data transmission with the second terminal.

In addition, that the first terminal determines to perform data transmission with the second terminal may be that the first terminal sends to-be-transmitted data to the second terminal, or may be that the first terminal receives to-be-transmitted data sent by the second terminal.

The preset user input operation may be that the user touches and controls an operation button that is of the first terminal and that corresponds to data transmission, shakes a terminal, turns over the terminal, or the like operation, which is not described herein one by one.

In the data transmission method disclosed in this embodiment of the present disclosure, because it is only required that a first magnet of a second terminal should trigger a sensor of a first terminal so that the sensor of the first terminal outputs a low-level output signal, the first terminal can establish a communication link with the second terminal, which simplifies a user operation such that a user does not need to perform a cumbersome operation, thereby resolving a problem in an existing data transmission method that data transmission time is prolonged because relatively long time is taken due to a cumbersome user operation.

The following describes, with reference to an example, the data transmission method disclosed in this embodiment.

Figure 2:
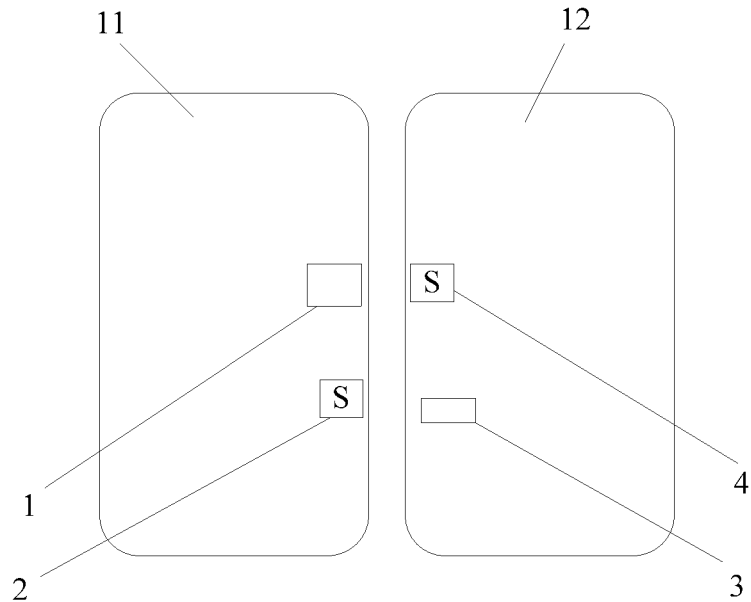
FIG. 2 is an instance diagram of a data transmission method according to an embodiment of the present disclosure.

Referring to FIG. 2, two terminals that perform data transmission are a first terminal 11 and a second terminal 12, where the first terminal 11 is equipped with one sensor 1 and one first magnet 2, and the second terminal 12 is equipped with one sensor 3 and one first magnet 4.

It is noted herein that in this embodiment, an example in which the first terminal 11 sends data to the second terminal 12 is used for description.

The first terminal 11 and the second terminal 12 are mutually approaching, and both sensors of the first terminal 11 and the second terminal 12 are located within a scope in which a magnetic line of a magnet of each other can be sensed. The sensor 1 of the first terminal 11 detects a magnetic line of the first magnet 4 of the second terminal 12, generates and outputs a first output signal, and at the same time, the sensor 3 of the second terminal 12 detects a magnetic line of the first magnet 2 of the first terminal 11, and generates and outputs a second output signal.

The first terminal 11 acquires an output signal of the sensor 1, determines the output signal as a low-level output signal, and establishes a communication link with the second terminal 12. The second terminal 12 acquires an output signal of the sensor 3, determines the output signal as a low-level output signal, and establishes a communication link with the first terminal 11.

After detecting a preset user input operation, the first terminal 11 determines that data transmission needs to be performed, and sends, to the second terminal 12 using the established communication link, data that needs to be transmitted. The second terminal 12 receives the data sent by the first terminal 11.

Figure 3:
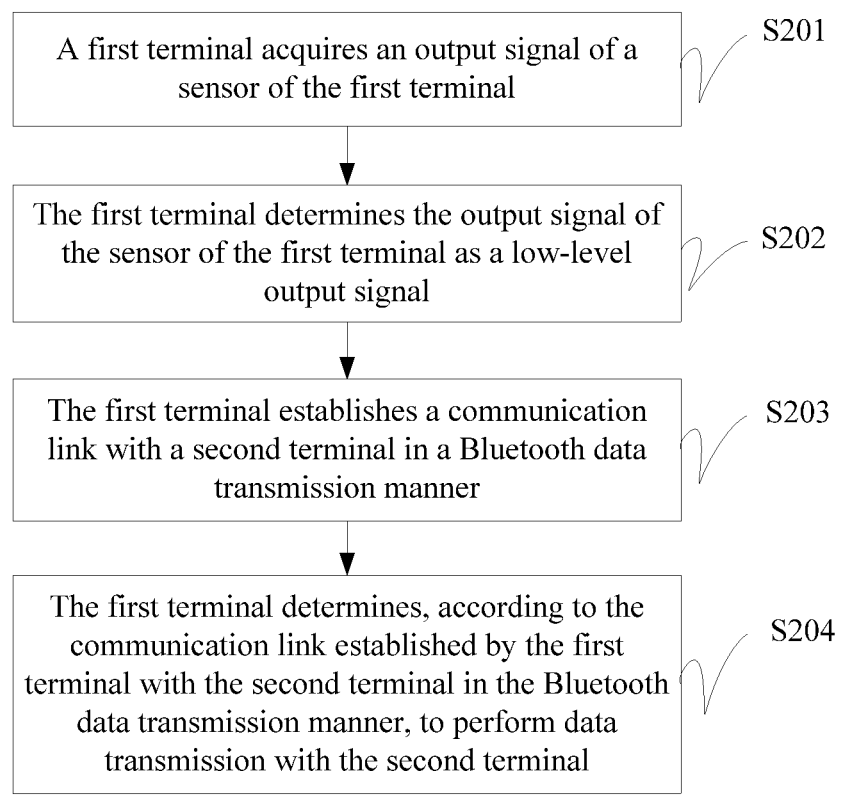
FIG. 3 is a flowchart of a data transmission method according to another embodiment of the present disclosure.

Another embodiment of the present disclosure further discloses a data transmission method. Referring to FIG. 3, the method includes the following steps.

Step S201: A first terminal acquires an output signal of a sensor of the first terminal.

The output signal of the sensor of the first terminal is a signal generated when a first magnet of a second terminal triggers the sensor of the first terminal.

Step S202: The first terminal determines the output signal of the sensor of the first terminal as a low-level output signal.

Similarly, in this embodiment, the low-level output signal is generated because the first magnet of the second terminal triggers the sensor of the first terminal when two terminals are mutually approaching.

Step S203: When the output signal of the sensor of the first terminal is the low-level output signal, the first terminal establishes a communication link with the second terminal in a BLUETOOTH data transmission manner.

Furthermore, that the first terminal establishes a communication link with the second terminal in a BLUETOOTH data transmission manner may be that the first terminal sends a BLUETOOTH connection request, and the second terminal receives and responds to the BLUETOOTH connection request, or certainly may be that the first terminal receives a BLUETOOTH connection request sent by the second terminal, and responds to the connection request.

Step S204: The first terminal determines, according to the communication link established by the first terminal with the second terminal in the BLUETOOTH data transmission manner, to perform data transmission with the second terminal.

Figure 4:
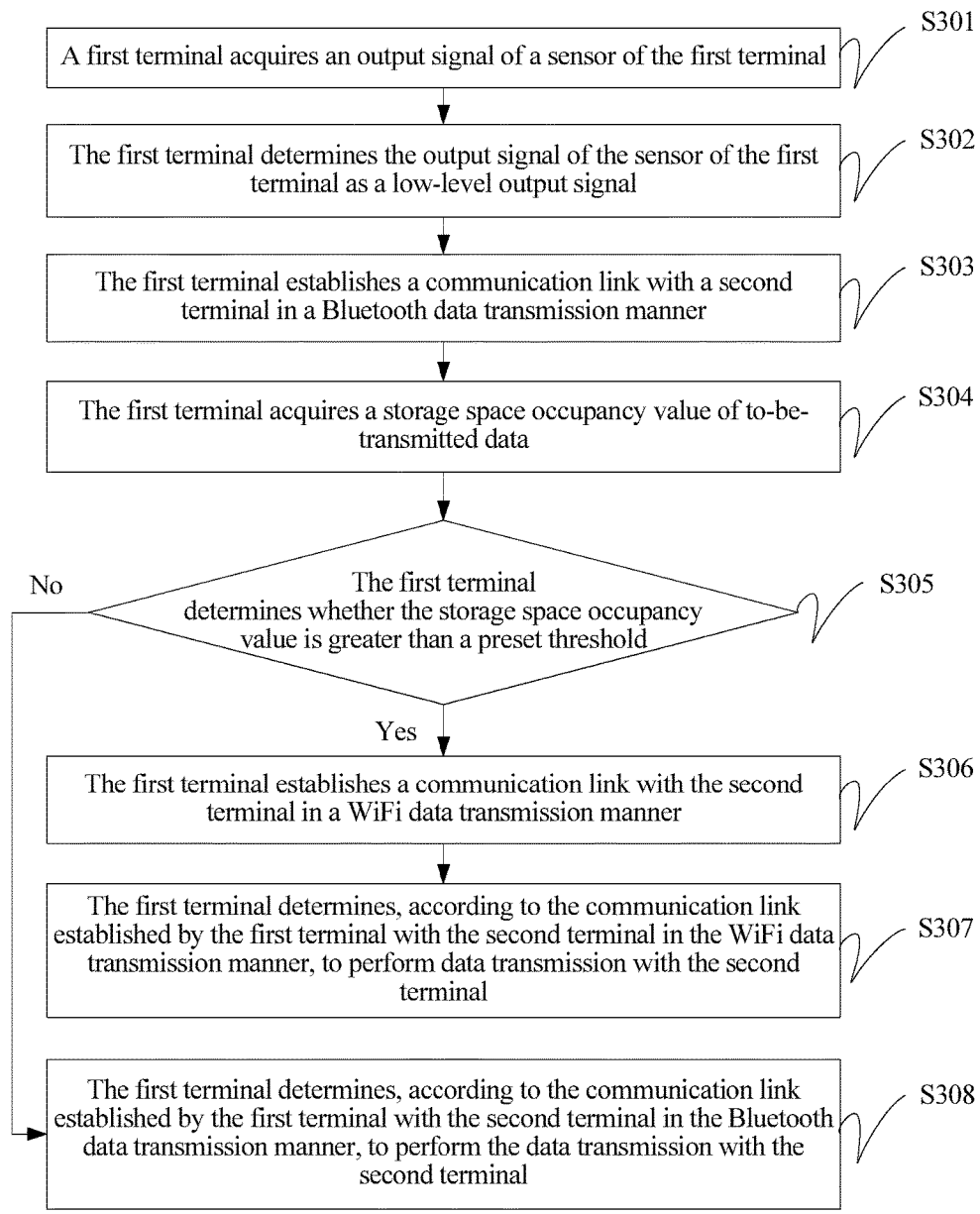
FIG. 4 is a flowchart of a data transmission method according to another embodiment of the present disclosure.

In this embodiment, a transmission speed can be ensured because the first terminal performs the data transmission with the second terminal by means of BLUETOOTH. However, if data that needs to be transmitted is relatively large and occupies relatively large space, a case in which transmission is interrupted may occur in BLUETOOTH transmission. Therefore, another embodiment of the present disclosure further discloses a data transmission method. Referring to FIG. 4, the method includes the following steps.

Step S301: A first terminal acquires an output signal of a sensor of the first terminal.

The output signal of the sensor of the first terminal is a signal generated when a first magnet of a second terminal triggers the sensor of the first terminal.

Step S302: The first terminal determines the output signal of the sensor of the first terminal as a low-level output signal.

Similarly, in this embodiment, the low-level output signal is generated because the first magnet of the second terminal triggers the sensor of the first terminal when two terminals are mutually approaching.

Step S303: When the output signal of the sensor of the first terminal is the low-level output signal, the first terminal establishes a communication link with the second terminal in a BLUETOOTH data transmission manner.

Step S304: The first terminal acquires a storage space occupancy value of to-be-transmitted data, where the to-be-transmitted data is to-be-transmitted data obtained when the first terminal determines to perform data transmission with the second terminal.

Step S305: The first terminal determines whether the storage space occupancy value is greater than a preset threshold.

Furthermore, the preset threshold may be set according to a practical situation, for example, may be 10 megabyte (MB).

If the first terminal determines that the storage space occupancy value is greater than the preset threshold, step S306 in which the first terminal establishes the communication link with the second terminal in a WiFi data transmission manner is performed, and step S307 in which the first terminal determines, according to the communication link established by the first terminal with the second terminal in the WiFi data transmission manner, to perform the data transmission with the second terminal continues to be performed.

If the first terminal determines that the storage space occupancy value is not greater than the preset threshold, step S308 in which the first terminal determines, according to the communication link established by the first terminal with the second terminal in the BLUETOOTH data transmission manner, to perform the data transmission with the second terminal is performed.

In this embodiment of the present disclosure, when the to-be-transmitted data is relatively large, and its storage space occupancy value exceeds a threshold, the two terminals are controlled to access a network by means of WiFi, and perform the data transmission using the network, which can avoid a problem that transmission may be interrupted because data is transmitted by means of BLUETOOTH when transmitted data is relatively large, thereby further improving user experience.

Figure 5:
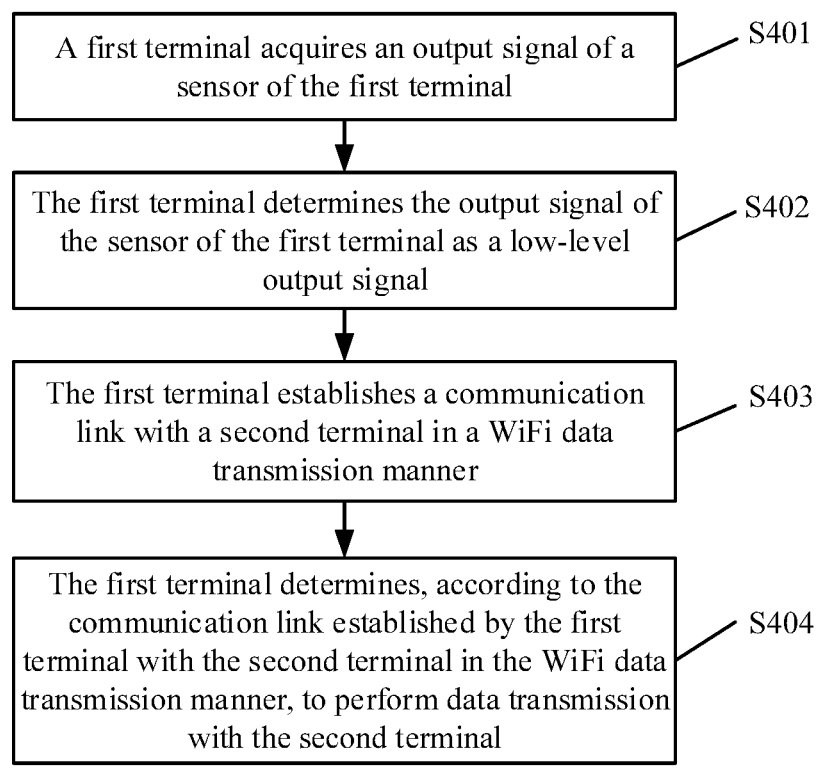
FIG. 5 is a flowchart of a data transmission method according to another embodiment of the present disclosure.

Another embodiment of the present disclosure further discloses a data transmission method. Referring to FIG. 5, the method includes the following steps.

Step S401: A first terminal acquires an output signal of a sensor of the first terminal.

The output signal of the sensor of the first terminal is a signal generated when a first magnet of a second terminal triggers the sensor of the first terminal.

Step S402: The first terminal determines the output signal of the sensor of the first terminal as a low-level output signal.

The low-level output signal is generated because the first magnet of the second terminal triggers the sensor of the first terminal when the first terminal and the second terminal are mutually approaching.

Step S403: When the output signal of the sensor of the first terminal is the low-level output signal, the first terminal establishes a communication link with the second terminal in a WiFi data transmission manner.

Step S404: The first terminal determines, according to the communication link established by the first terminal with the second terminal in the WiFi data transmission manner, to perform data transmission with the second terminal.

In this embodiment, two terminals that need to perform data transmission both access a network by means of WiFi. The first terminal sends to-be-transmitted data to the second terminal using the network, and may transmit data in a form of email, or in another manner, which is not described herein one by one.

Figure 6:
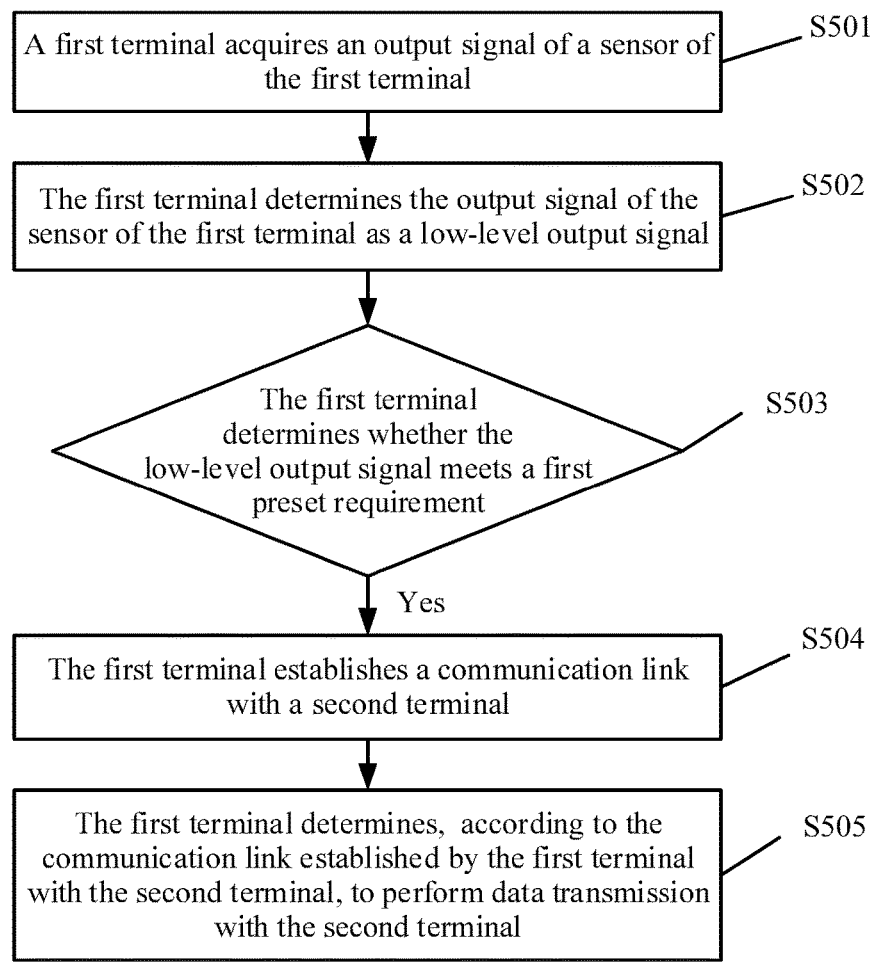
FIG. 6 is a flowchart of a data transmission method according to another embodiment of the present disclosure.

Another embodiment of the present disclosure further discloses a data transmission method. Referring to FIG. 6, the method includes the following steps.

Step S501: A first terminal acquires an output signal of a sensor of the first terminal.

The output signal of the sensor of the first terminal is a signal generated when a first magnet of a second terminal triggers the sensor of the first terminal.

Step S502: The first terminal determines the output signal of the sensor of the first terminal as a low-level output signal.

The low-level output signal is generated because the first magnet of the second terminal triggers the sensor of the first terminal when two terminals are mutually approaching.

Step S503: The first terminal determines whether the low-level output signal meets a first preset requirement.

The first preset requirement is that a pole N of the first magnet of the second terminal triggers the sensor of the first terminal to generate the low-level output signal.

Step S504: If it is determined that the low-level output signal meets the first preset requirement, the first terminal establishes a communication link with the second terminal is performed.

Step S505: The first terminal determines, according to the communication link established by the first terminal with the second terminal, to perform data transmission with the second terminal.

Figure 7:
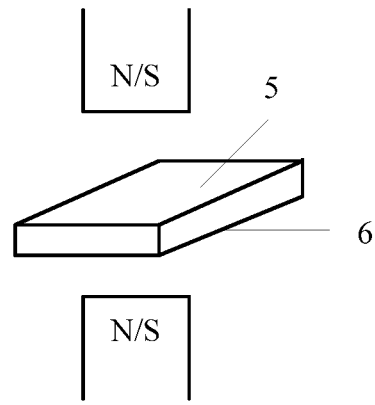
FIG. 7 is a schematic diagram of a principle of a sensor according to an embodiment of the present disclosure.

In this embodiment, the first magnet of the second terminal triggers the sensor of the first terminal. Regardless of whether the triggering is performed by a pole N or a pole S, the output signal of the sensor is a low-level signal. However, when different poles of a magnet trigger the sensor, output ports of the low-level output signal of the sensor are different. For details, refer to FIG. 7, FIG. 8A, and FIG. 8B.

Figure 8A:
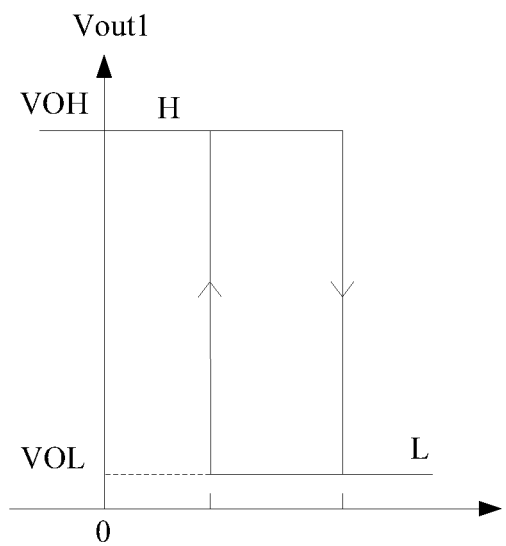
FIG. 8A is a coordinate diagram of an output signal of a sensor according to an embodiment of the present disclosure.
Figure 8B:
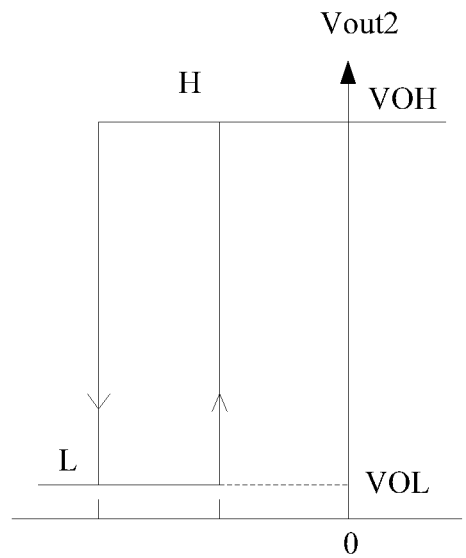
FIG. 8B is a coordinate diagram of an output signal of another sensor according to an embodiment of the present disclosure.

A direction of a magnetic line of a first magnet is from a top surface 5 to a bottom surface 6 of the sensor. Referring to FIG. 8A, an output signal of a first output port of the sensor is pulled low, the low-level output signal is output, and it is determined that triggering is performed by a pole N of the first magnet. The direction of the magnetic line of the first magnet is from the bottom surface 6 to the top surface 5 of the sensor. Referring to FIG. 8B, an output signal of a second output port of the sensor is pulled low, the low-level output signal is output, and it is determined that triggering is performed by a pole S of the first magnet.

Certainly, it may be set that when the sensor is triggered by the pole N of the first magnet, the second output port outputs the low-level output signal. When the sensor is triggered by the pole S of the first magnet, the first output port outputs the low-level output signal. In addition, a direction of receiving the magnetic line of the first magnet is not limited to a top surface and a bottom surface, provided that it is ensured that the direction is two opposite surfaces of the sensor.

Therefore, in this embodiment, in step S503 in which the first terminal determines whether the low-level output signal meets a first preset requirement, it may be determined whether the low-level output signal meets the first preset requirement by detecting whether an output port outputting the low-level output signal is a preset output port of the sensor triggered by the pole N of the first magnet.

Figure 9:
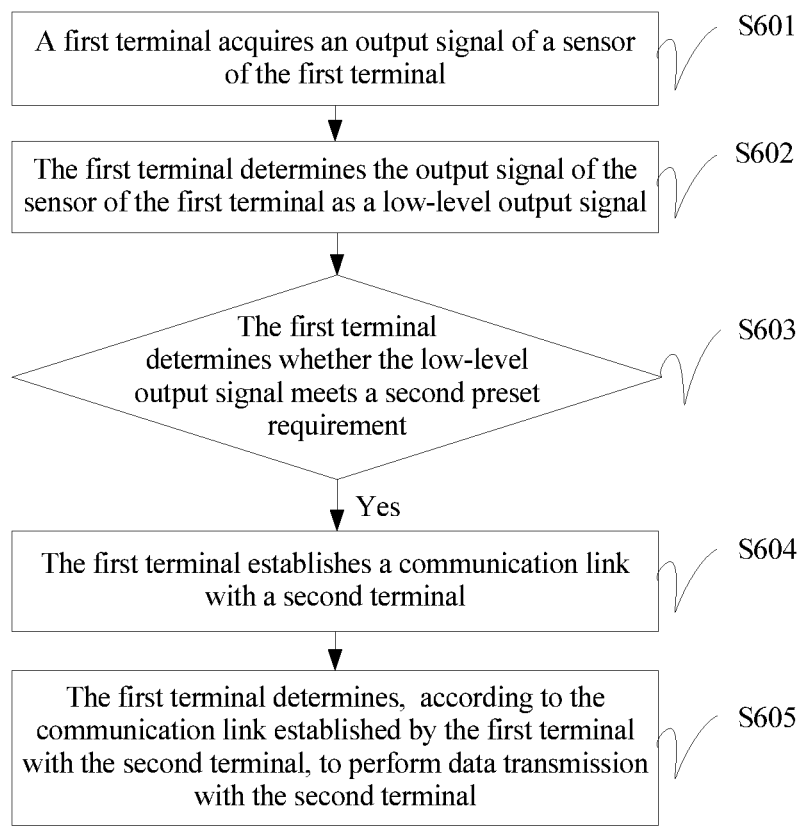
FIG. 9 is a flowchart of a data transmission method according to another embodiment of the present disclosure.

Another embodiment of the present disclosure further discloses a data transmission method. Referring to FIG. 9, the method includes the following steps.

Step S601: A first terminal acquires an output signal of a sensor of the first terminal.

The output signal of the sensor of the first terminal is a signal generated when a first magnet of a second terminal triggers the sensor of the first terminal.

Step S602: The first terminal determines the output signal of the sensor of the first terminal as a low-level output signal.

The low-level output signal is generated because the first magnet of the second terminal triggers the sensor of the first terminal when two terminals are mutually approaching.

Step S603: The first terminal determines whether the low-level output signal meets a second preset requirement.

The second preset requirement is that a pole S of the first magnet of the second terminal triggers the sensor of the first terminal to generate the low-level output signal.

Step S604: If it is determined that the low-level output signal meets the second preset requirement the first terminal establishes a communication link with the second terminal.

Step S605: The first terminal determines, according to the communication link established by the first terminal with the second terminal, to perform data transmission with the second terminal continues to be performed.

In this embodiment, the pole S of the first magnet of the second terminal triggers the sensor of the first terminal, and then a connection of a communication link between the two terminals is established, which can avoid interference generated by a pole N of another component on the first terminal by means of triggering.

Similarly, in this embodiment, in step S603, it may be determined whether the low-level output signal meets the second preset requirement by detecting whether an output port outputting the low-level output signal is a preset output port of the sensor of the first terminal triggered by the pole S of the first magnet of the second terminal.

Figure 10A:
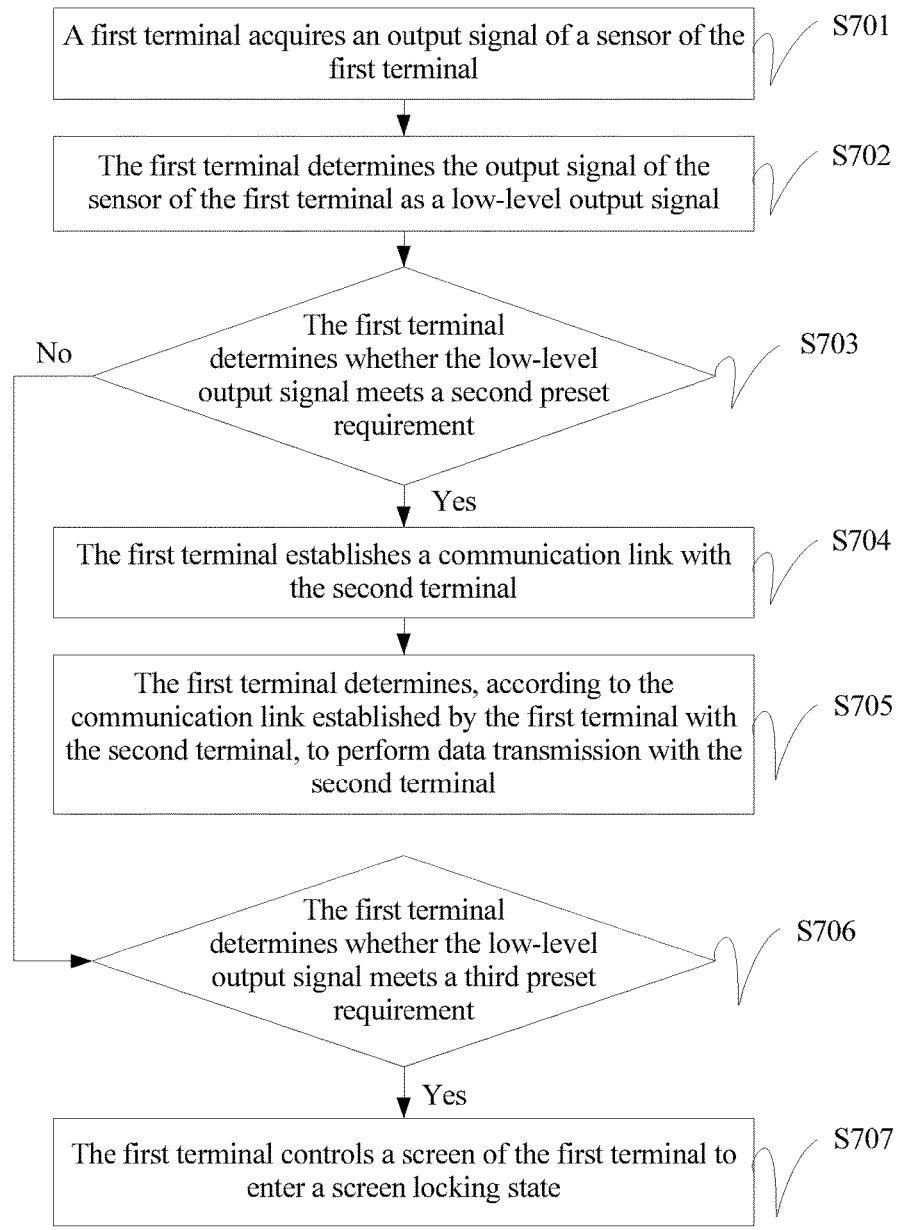
FIG. 10A is a flowchart of a data transmission method according to another embodiment of the present disclosure.

Another embodiment of the present disclosure further discloses a data transmission method. The data transmission method disclosed in this embodiment is applied to a terminal. In addition to being equipped with a sensor and a first magnet, the terminal further includes a second magnet, where the second magnet is disposed on a jacket of the first terminal. Referring to FIG. 10A, the data transmission method includes the following steps.

Step S701: A first terminal acquires an output signal of a sensor of the first terminal.

The output signal of the sensor of the first terminal is a signal generated when a first magnet of a second terminal triggers the sensor of the first terminal.

Step S702: The first terminal determines the output signal of the sensor of the first terminal as a low-level output signal.

The low-level output signal is generated because the first magnet of the second terminal triggers the sensor of the first terminal when two terminals are mutually approaching.

Step S703: The first terminal determines whether the low-level output signal meets a second preset requirement.

The second preset requirement is that a pole S of the first magnet of the second terminal triggers the sensor of the first terminal to generate the low-level output signal.

Step S704: If it is determined that the low-level output signal meets the second preset requirement, the first terminal establishes a communication link with the second terminal is performed.

Step S705: The first terminal determines, according to the communication link established by the first terminal with the second terminal, to perform data transmission with the second terminal continues to be performed.

Step S706: If it is determined that the low-level output signal does not meet the second preset requirement, the first terminal determines whether the low-level output signal meets a third preset requirement is performed, where the third preset requirement is that the second magnet of the first terminal triggers, when approaching the sensor of the first terminal because the jacket of the first terminal is closed, the sensor of the first terminal to generate the low-level output signal.

Step S707: If it is determined that the low-level output signal meets the third preset requirement, the first terminal controls a screen of the first terminal to enter a screen locking state is performed.

In this embodiment, when the jacket of the first terminal is closed, the second magnet of the first terminal approaches the sensor of the first terminal. A magnetic line of the second magnet of the first terminal triggers the sensor of the first terminal, and the sensor of the first terminal outputs a low-level signal. In addition, when different poles of the second magnet of the first terminal trigger the sensor, different output ports of the sensor of the first terminal output a low-level signal.

Furthermore, in step S706, it may be determined whether the low-level output signal meets the third preset requirement by detecting whether an output port outputting the low-level output signal is a preset output port of the sensor of the first terminal triggered by the second magnet of the first terminal.

Preferably, that a pole N of the second magnet of the first terminal triggers the sensor of the first terminal may be set as the third preset requirement. Correspondingly, detecting the output port that is of the sensor of the first terminal and that outputs the low-level output signal when the pole N of the second magnet of the first terminal triggers the sensor of the first terminal is determining whether the third preset requirement is met.

Figure 10B:
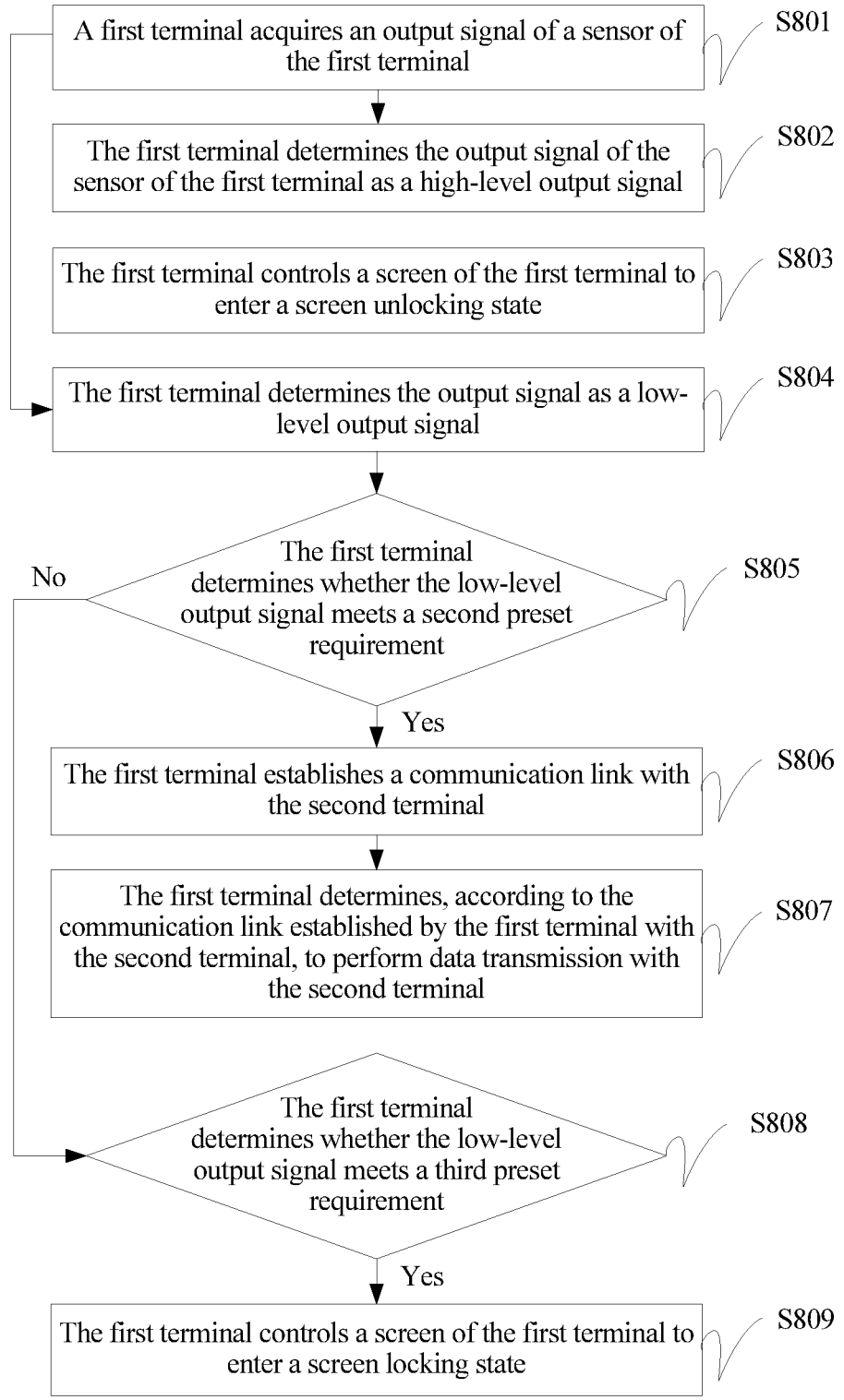
FIG. 10B is a flowchart of a data transmission method according to another embodiment of the present disclosure.

Another embodiment of the present disclosure further discloses a data transmission method, which is the same as the method disclosed in the foregoing embodiment, and applied to the first terminal. In addition to being equipped with a sensor and a first magnet, the first terminal is further equipped with a second magnet, where the second magnet is disposed on a jacket of the first terminal. Referring to FIG. 10B, the data transmission method includes the following steps.

Step S801: A first terminal acquires an output signal of a sensor of the first terminal.

The output signal of the sensor of the first terminal is a signal generated when a first magnet of a second terminal triggers the sensor of the first terminal.

Step S802: The first terminal determines the output signal of the sensor of the first terminal as a high-level output signal.

The high-level output signal is a signal generated by triggering the sensor of the first terminal when the second magnet of the first terminal is far from the sensor of the first terminal because the jacket of the first terminal is open.

Step S803: The first terminal controls a screen of the first terminal to enter a screen unlocking state.

Step S804: The first terminal determines the output signal as a low-level output signal.

The low-level output signal is generated because the first magnet of the second terminal triggers the sensor of the first terminal when two terminals are mutually approaching.

Step S805: The first terminal determines whether the low-level output signal meets a second preset requirement.

The second preset requirement is that a pole S of the first magnet of the first terminal triggers the sensor of the first terminal to generate the low-level output signal.

Step S806: If it is determined that the low-level output signal meets the second preset requirement, the first terminal establishes a communication link with the second terminal is performed.

Step S807: The first terminal determines, according to the communication link established by the first terminal with the second terminal, to perform data transmission with the second terminal continues to be performed.

Step S808: Preferably, in step S805, if it is determined that the low-level output signal does not meet the second preset requirement, the first terminal determines whether the low-level output signal meets a third preset requirement is performed, where the third preset requirement is that the second magnet of the first terminal triggers, when approaching the sensor of the first terminal because the jacket of the first terminal is closed, the sensor of the first terminal to generate the low-level output signal.

Step S809: If it is determined that the low-level output signal meets the third preset requirement, the first terminal controls a screen of the first terminal to enter a screen locking state is performed.

In this embodiment, a second magnet of a first terminal is approaching or far from a sensor of the first terminal, which opens or closes a screen of the first terminal accordingly. Therefore, when a user opens a jacket of the first terminal, the first terminal automatically unlocks the screen. When the user closes the jacket of the first terminal, the first terminal automatically locks the screen, which simplifies a screen unlocking operation and a screen locking operation of the user, thereby saving time.

Another embodiment of the present disclosure further discloses a terminal, including a first magnet, a sensor, a processor, and a memory, where the sensor is configured to be triggered by a first magnet of a second terminal to generate an output signal, the memory is configured to store a program, the processor is configured to execute the program stored by the memory, and a process in which the processor executes the program stored by the memory includes acquiring the output signal of the sensor, determining the output signal of the sensor as a low-level output signal, when the output signal of the sensor is the low-level output signal, controlling the terminal to establish a communication link with the second terminal, and controlling, according to the communication link established by the terminal with the second terminal, the terminal to determine to perform data transmission with the second terminal.

For a specific working process of each component in the terminal disclosed in this embodiment, refer to content of the embodiment corresponding to FIG. 1, and details are not described herein again.

In the terminal disclosed in this embodiment of the present disclosure, because it is only required that a magnet of a second terminal should trigger a sensor of the terminal so that the sensor of the terminal outputs a low-level output signal, the terminal can establish a communication link with the second terminal, which simplifies a user operation such that a user does not need to perform a cumbersome operation, thereby resolving a problem in an existing data transmission method that data transmission time is prolonged because relatively long time is taken due to a cumbersome user operation.

For a structure of the terminal disclosed in this embodiment, refer to FIG. 2 (the figure does not show the processor and the memory). Using a terminal 11 as an example, the terminal 11 includes one sensor and one first magnet, and it needs to be ensured that a distance between the first magnet and the sensor $\geq 25$ millimeter (mm). Therefore, it may be ensured that the first magnet within the terminal 11 does not cause interference to the sensor.

It should be noted herein that in FIG. 2, in the terminal, a pole S of the first magnet faces outwards, and a pole N faces inwards. Two sensing surfaces of the sensor are respectively a top surface and a bottom surface. In this case, when two terminals are approaching on a same horizontal plane, a first magnet of one terminal may trigger a sensor of the other terminal.

Certainly, FIG. 2 shows only one setting manner of a sensor and of a first magnet, and the first magnet and the sensor may have another setting manner, provided that when two terminals are mutually approaching, two opposite surfaces of the sensor can successively perceive a magnetic line of the first magnet.

Preferably, a size of the first magnet may be $\geq 3\times 7\times 1.2$ mm, where 3 mm indicates a width, 7 mm indicates a length, and 1.2 mm indicates a height. In this case, it needs to be ensured that sensors on two terminals can perceive the magnetic line of the first magnet of each other within a separation distance of 6 mm between the two terminals. Certainly, the first magnet may be set to another size.

In addition, the first magnet may be an existing magnet of any material in the prior art, for example, neodymium iron boron N52. To avoid reversing the pole N and the pole S of the first magnet, foolproof design may be performed. Corner cutting processing is performed on either pole of the first magnet, for example, a length of a cut corner may be 1, and a width may be 1, which consequently avoids affecting a function of the first magnet.

Figure 11A:
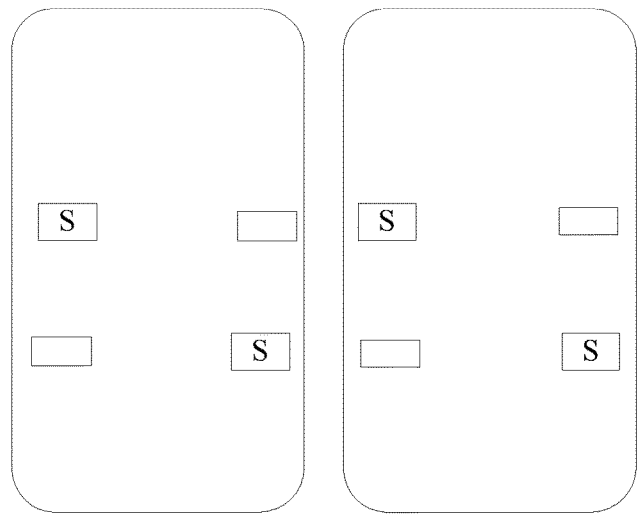
FIG. 11A is a schematic structural diagram of a data transmission system according to another embodiment of the present disclosure.
Figure 11B:
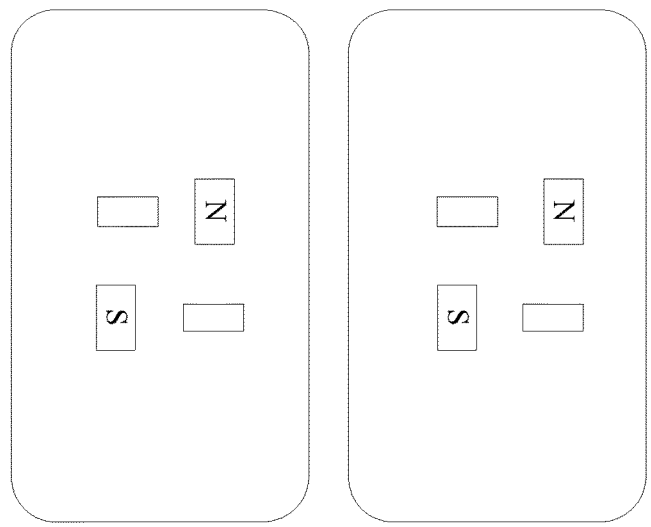
FIG. 11B is a schematic structural diagram of a data transmission system according to another embodiment of the present disclosure.

It should be further noted herein that in this embodiment, the terminal may be equipped with two sensors and two first magnets, for its setting manner, refer to FIG. 11A and FIG. 11B, however, which is not limited to these two manners.

When the terminal is equipped with only two sensors and two first magnets, and when the two sensors are both triggered by a first magnet of another terminal to generate an output signal, it may be determined whether there is a low-level output signal in two output signals. If there is a low-level output signal in two output signals, a communication link between the terminal and another terminal is established. Therefore, it can be ensured that the terminal may simultaneously establish a connection of the communication link with two other terminals.

Preferably, in the terminal disclosed in another embodiment of the present disclosure, that the processor of the terminal controls the terminal to establish the communication link with the second terminal includes controlling, by the processor, the terminal to establish the communication link with the second terminal in a BLUETOOTH data transmission manner.

Correspondingly, the processor controls, according to the communication link established by the terminal with the second terminal in the BLUETOOTH data transmission manner, the terminal to determine to perform data transmission with the second terminal.

Similarly, preferably, in the terminal disclosed in another embodiment of the present disclosure, that the processor of the terminal controls the terminal to establish the communication link with the second terminal includes controlling, by the processor, the terminal to establish the communication link with the second terminal in a WiFi data transmission manner.

Correspondingly, the processor controls, according to the communication link established by the terminal with the second terminal in the WiFi data transmission manner, the terminal to determine to perform data transmission with the second terminal.

Another embodiment of the present disclosure further discloses a terminal, including a first magnet, a sensor, a processor, and a memory, where the sensor is configured to be triggered by a first magnet of a second terminal to generate an output signal, the memory is configured to store a program, the processor is configured to execute the program stored by the memory, and a process in which the processor executes the program stored by the memory includes acquiring the output signal of the sensor, determining the output signal of the sensor as a low-level output signal, and when the output signal of the sensor is the low-level output signal, controlling the terminal to establish a communication link with the second terminal in a BLUETOOTH data transmission manner, acquiring a storage space occupancy value of to-be-transmitted data, where the to-be-transmitted data is to-be-transmitted data obtained when the terminal determines to perform data transmission with the second terminal, when it is determined that the storage space occupancy value is greater than a preset threshold, controlling the terminal to establish the communication link with the second terminal in a WiFi data transmission manner, and controlling, according to the communication link established by the terminal with the second terminal in the WiFi data transmission manner, the terminal to determine to perform the data transmission with the second terminal, and when it is determined that the storage space occupancy value is not greater than the preset threshold, controlling, by the processor according to the communication link established by the terminal with the second terminal in a BLUETOOTH data transmission manner, the terminal to determine to perform the data transmission with the second terminal.

For a specific working process of each component in the terminal disclosed in this embodiment, refer to content of the embodiment corresponding to FIG. 4, and details are not described herein again.

Another embodiment of the present disclosure further discloses a terminal, where the terminal includes a first magnet, a sensor, a processor, and a memory, where the processor further has the following functions before controlling the terminal to establish the communication link with the second terminal, the processor is further configured to control the terminal to determine that the low-level output signal of the sensor of the terminal meets a first preset requirement, where the first preset requirement is that a pole N of the first magnet of the second terminal triggers the sensor of the terminal to generate the low-level output signal.

It should be noted herein that in this embodiment, corresponding to a new function of the processor, the memory stores a program corresponding to the function.

Similarly, another embodiment of the present disclosure further discloses a terminal, where the terminal includes a first magnet, a sensor, a processor, and a memory, where the processor further has the following functions before controlling the terminal to establish the communication link with the second terminal, the processor is further configured to control the terminal to determine that the low-level output signal of the sensor of the terminal meets a second preset requirement, where the second preset requirement is that a pole S of the first magnet of the second terminal triggers the sensor of the terminal to generate the low-level output signal.

Similarly, it should be noted that in this embodiment, corresponding to a new function of the processor, the memory further stores a program corresponding to the function.

According to a terminal disclosed in another embodiment of the present disclosure, in addition to including the first magnet, the sensor, the processor, and the memory, the terminal further includes a second magnet, where the second magnet is disposed on a jacket of the terminal, where the sensor is configured to be triggered by a first magnet and a second magnet that are of the first terminal to generate an output signal, the memory is configured to store a program, the processor is configured to execute the program stored by the memory, and a process in which the processor executes the program stored by the memory includes acquiring the output signal of the sensor, determining the output signal of the sensor as a low-level output signal, when it is determined that the low-level output signal of the sensor of the terminal meets the second preset requirement, controlling the terminal to establish a communication link with the second terminal, and controlling, according to the communication link established by the terminal with the second terminal, the terminal to determine to perform data transmission with the second terminal, and determining that the low-level output signal of the sensor of the terminal does not meet the second preset requirement, and when it is determined that the low-level output signal of the sensor of the first terminal meets a third preset requirement, controlling a screen of the terminal to enter a screen locking state, where the second preset requirement is that a pole S of the first magnet of the second terminal triggers the sensor of the terminal to generate the low-level output signal, and the third preset requirement is that the second magnet of the first terminal triggers, when approaching the sensor of the first terminal because the jacket of the first terminal is closed, the sensor of the first terminal to generate the low-level output signal.

Preferably, in the terminal disclosed in another embodiment of the present disclosure, the processor is further configured to determine the output signal of the sensor of the terminal as a high-level output signal, and control the screen of the terminal to enter a screen unlocking state, where the high-level output signal is a signal generated by triggering the sensor of the first terminal when the second magnet of the first terminal is far from the sensor of the first terminal because the jacket of the first terminal is open.

In the foregoing embodiment, a second magnet of a terminal is approaching or far from a sensor of the terminal, which opens or closes a screen of the terminal accordingly. Therefore, when a user opens a jacket of the terminal, the terminal automatically unlocks the screen, when the user closes the jacket of the terminal, the terminal automatically locks the screen, which simplifies a screen unlocking operation and a screen locking operation of the user, thereby saving time.

Another embodiment of the present disclosure further discloses a data transmission system. For its structure, refer to FIG. 2. The data transmission system includes a first terminal and a second terminal, where both the first terminal and the second terminal are equipped with a sensor and a first magnet.

When the first terminal and the second terminal are mutually approaching, a first magnet of the first terminal triggers a sensor of the second terminal, and the sensor of the second terminal generates an output signal. A first magnet of the second terminal triggers a sensor of the first terminal, and the sensor of the first terminal generates an output signal.

The first terminal is configured to acquire the output signal of the sensor of the first terminal, determine the output signal of the sensor of the first terminal as a low-level output signal, establish a communication link with the second terminal, and determine, according to the communication link established by the first terminal with the second terminal, to perform data transmission with the second terminal.

The second terminal is configured to acquire the output signal of the sensor of the second terminal, determine the output signal of the sensor of the second terminal as a low-level output signal, establish a communication link with the first terminal, and determine, according to the communication link established by the second terminal with the first terminal, to perform data transmission with the first terminal.

In the data transmission system disclosed in this embodiment, a first magnet of a first terminal triggers a sensor of a second terminal such that the sensor of the second terminal generates an output signal, a first magnet of the second terminal triggers a sensor of the first terminal such that the sensor of the first terminal generates an output signal. In addition, a communication link between the first terminal and the second terminal may be established when it is determined that both the output signal of the sensor of the second terminal and the output signal of the sensor of the first terminal are low-level output signals, which simplifies a user operation such that a user does not need to perform a cumbersome operation, thereby resolving a problem in an existing data transmission method that data transmission time is prolonged because relatively long time is taken due to a cumbersome user operation.

Another embodiment of the present disclosure further discloses a data transmission system, including a first terminal and a second terminal, where both the first terminal and the second terminal are equipped with a sensor and a first magnet.

When the first terminal and the second terminal are mutually approaching, the first magnet of the first terminal triggers the sensor of the second terminal, and the sensor of the second terminal generates an output signal. The first magnet of the second terminal triggers the sensor of the first terminal, and the sensor of the first terminal generates an output signal.

The following describes, in a data exchange manner, the data transmission system disclosed in this embodiment.

Figure 12A:
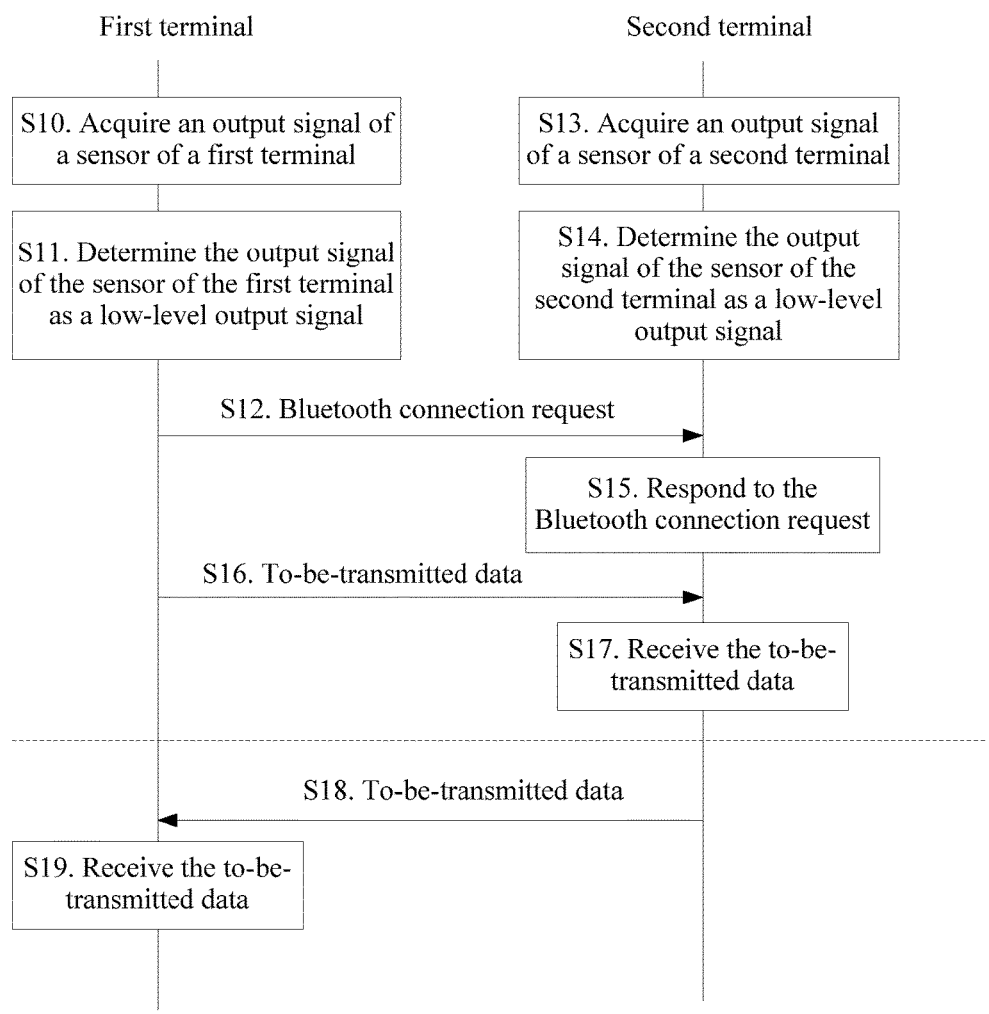
FIG. 12A is a sequence diagram of a working process of a data transmission system according to an embodiment of the present disclosure.

Reference is made to FIG. 12A and the data exchange manner may include the following steps.

Step S10: The first terminal acquires the output signal of the sensor of the first terminal.

Step S11: The first terminal determines the output signal of the sensor of the first terminal as a low-level output signal.

Step S12: The first terminal sends a BLUETOOTH connection request to the second terminal.

Step S13: The second terminal acquires the output signal of the sensor of the second terminal.

Step S14: Determine the output signal of the sensor of the second terminal as a low-level output signal.

Step S15: The second terminal receives and responds to the BLUETOOTH connection request sent by the first terminal.

Step S16: The first terminal sends to-be-transmitted data to the second terminal according to a communication link established by the first terminal with the second terminal in a BLUETOOTH connection manner.

Step S17: The second terminal receives the to-be-transmitted data sent by the first terminal.

Step S18: Alternatively, the second terminal sends to-be-transmitted data to the first terminal according to a communication link established by the second terminal with the first terminal in a BLUETOOTH connection manner.

Step S19: The first terminal receives the to-be-transmitted data sent by the second terminal.

Figure 12B:
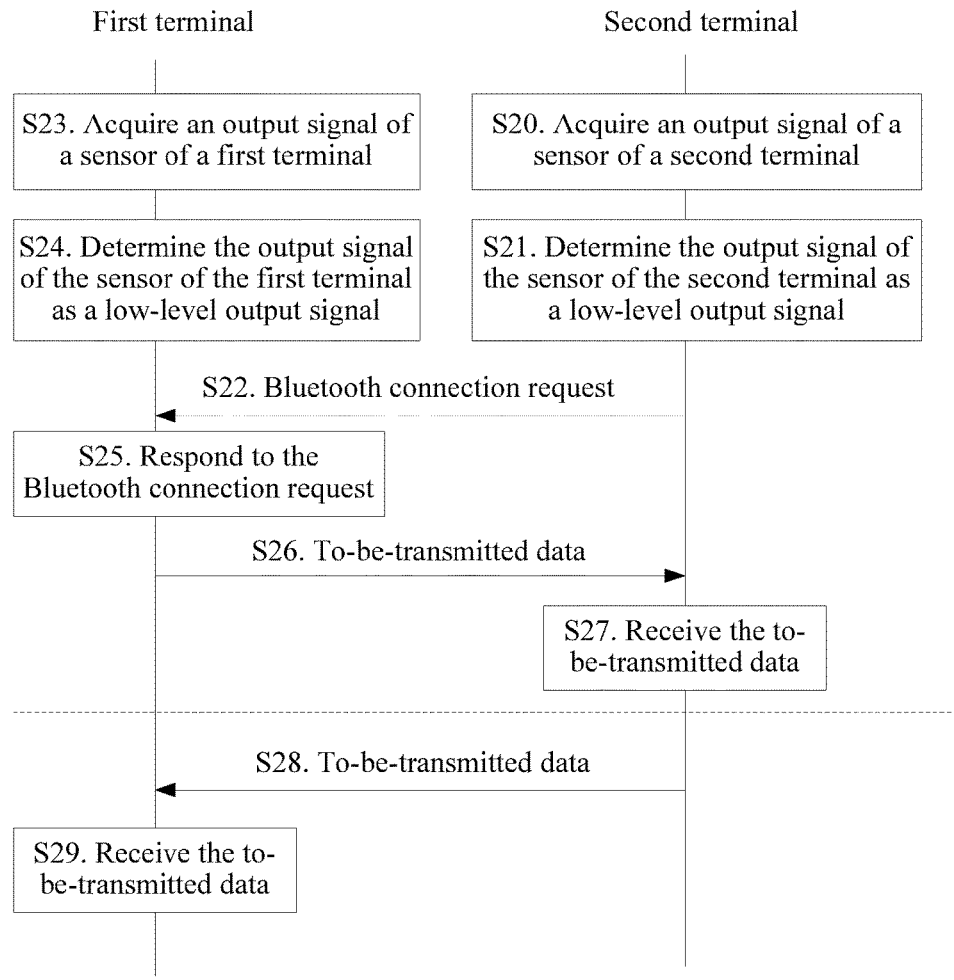
FIG. 12B is a working process sequence diagram of a data transmission system according to another embodiment of the present disclosure.

Reference is made to FIG. 12B and the data exchange manner may include the following steps.

Step S20: The second terminal acquires the output signal of the sensor of the second terminal.

Step S21: The second terminal determines the output signal of the sensor of the second terminal as a low-level output signal.

Step S22: The second terminal sends a BLUETOOTH connection request to the first terminal.

Step S23: The first terminal acquires the output signal of the sensor of the first terminal.

Step S24: Determine the output signal of the sensor of the first terminal as a low-level output signal.

Step S25: The first terminal receives and responds to the BLUETOOTH connection request sent by the second terminal.

Step S26: The first terminal sends to-be-transmitted data to the second terminal according to a communication link established by the first terminal with the second terminal in a BLUETOOTH connection manner.

Step S27: The second terminal receives the to-be-transmitted data sent by the first terminal.

Step S28. Alternatively the second terminal sends to-be-transmitted data to the first terminal according to a communication link established by the second terminal with the first terminal in a BLUETOOTH connection manner.

Step S29: The first terminal receives the to-be-transmitted data sent by the second terminal.

In the data transmission system disclosed in this embodiment, a first terminal performs data transmission with a second terminal by means of BLUETOOTH, which is quick and convenient. When to-be-transmitted data of the data transmission system is relatively large, transmitting data by means of BLUETOOTH may cause interruption of data transmission. Therefore, reference is made to a data transmission system disclosed in another embodiment of the present disclosure.

The data transmission system in this embodiment includes a first system and a second system, where both the first terminal and the second are equipped with a sensor and a first magnet.

When the first terminal and the second terminal are mutually approaching, the first magnet of the first terminal triggers the sensor of the second terminal, and the sensor of the second terminal generates an output signal. The first magnet of the second terminal triggers the sensor of the first terminal, and the sensor of the first terminal generates an output signal.

Likewise, the data transmission system disclosed in this embodiment is described in a data exchange manner.

Figure 13A:
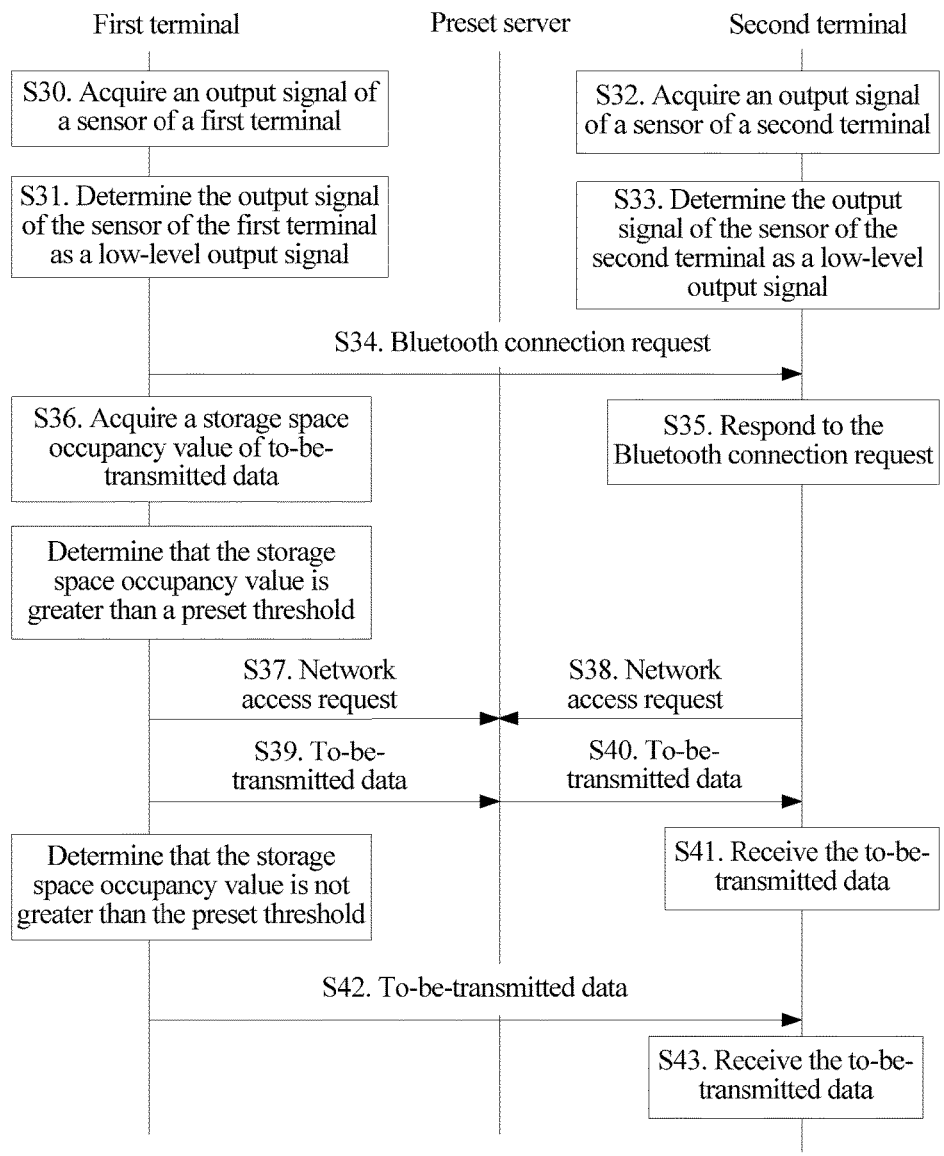
FIG. 13A is a working process sequence diagram of a data transmission system according to another embodiment of the present disclosure.

Reference is made to FIG. 13A and the data exchange manner may include the following steps.

Step S30: The first terminal acquires the output signal of the sensor of the first terminal.

Step S31: The first terminal determines the output signal of the sensor of the first terminal as a low-level output signal.

Step S32: The second terminal acquires the output signal of the sensor of the second terminal.

Step S33: Determine the output signal of the sensor of the second terminal as a low-level output signal.

Step S34: The first terminal sends a BLUETOOTH connection request to the second terminal.

Step S35: The second terminal receives and responds to the BLUETOOTH connection request sent by the first terminal.

Step S36: The first terminal acquires a storage space occupancy value of to-be-transmitted data, where the to-be-transmitted data is to-be-transmitted data obtained when the first terminal determines to perform data transmission with the second terminal.

Step S37: When the first terminal determines that the storage space occupancy value is greater than a preset threshold, the first terminal sends a network access request to a preset server.

Step S38: The second terminal sends a network access request to the preset server.

Step S39: The first terminal sends the to-be-transmitted data to the preset server.

Step S40: The preset server forwards the to-be-transmitted data to the second terminal.

Step S41: The second terminal receives the to-be-transmitted data.

Step S42: When the first terminal determines that the storage space occupancy value is not greater than the preset threshold, the first terminal sends the to-be-transmitted data to the second terminal using a communication link based on BLUETOOTH transmission.

Step S43: The second terminal receives the to-be-transmitted data.

Figure 13B:
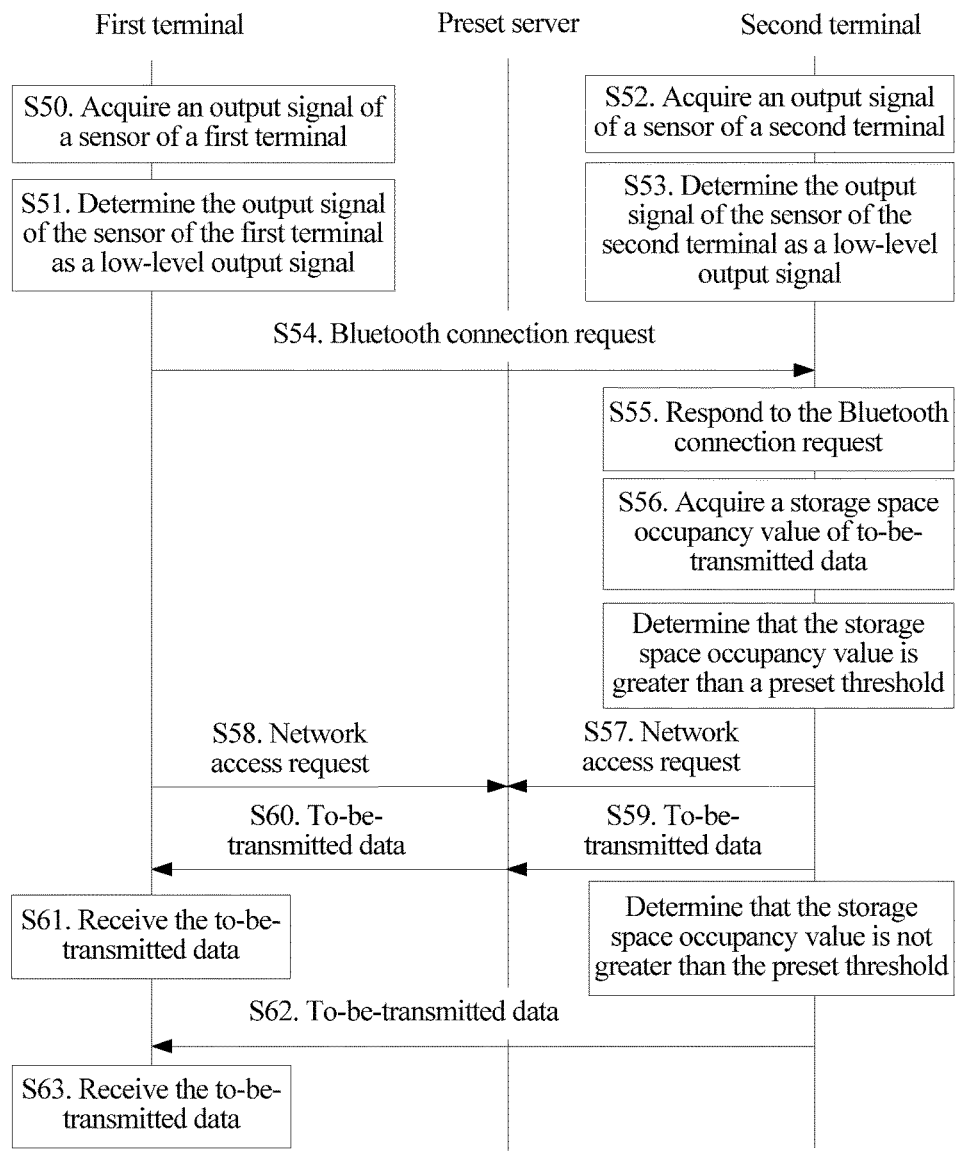
FIG. 13B is a working process sequence diagram of a data transmission system according to another embodiment of the present disclosure.

Reference is made to FIG. 13B and the data exchange manner may include the following steps.

Step S50: The first terminal acquires the output signal of the sensor of the first terminal.

Step S51: The first terminal determines the output signal of the sensor of the first terminal as a low-level output signal.

Step S52: The second terminal acquires the output signal of the sensor of the second terminal.

Step S53: Determine the output signal of the sensor of the second terminal as a low-level output signal.

Step S54: The first terminal sends a BLUETOOTH connection request to the second terminal.

Step S55: The second terminal receives and responds to the BLUETOOTH connection request sent by the first terminal.

Step S56: The second terminal acquires a storage space occupancy value of to-be-transmitted data, where the to-be-transmitted data is to-be-transmitted data obtained when the second terminal determines to perform data transmission with the first terminal.

Step S57: When the second terminal determines that the storage space occupancy value is greater than a preset threshold, the second terminal sends a network access request to a preset server.

Step S58: The first terminal sends a network access request to the preset server.

Step S59: The second terminal sends the to-be-transmitted data to the preset server.

Step S60: The preset server forwards the to-be-transmitted data to the first terminal.

Step S61: The first terminal receives the to-be-transmitted data.

Step S62: When the second terminal determines that the storage space occupancy value is not greater than the preset threshold, the second terminal sends the to-be-transmitted data to the first terminal using a communication link based on BLUETOOTH transmission.

Step S63: The first terminal receives the to-be-transmitted data.

It should be noted herein that according to the foregoing two embodiments of the present disclosure, a first terminal sends a BLUETOOTH connection request to the second terminal, and the second terminal responds to the BLUETOOTH connection request. Certainly, that the second terminal sends the BLUETOOTH connection request to the first terminal, and the first terminal responds to the BLUETOOTH connection request is also within a protection scope of the present disclosure. For a specific process, refer to the content disclosed in the foregoing two embodiments.

Another embodiment of the present disclosure further discloses a data transmission system, including a first terminal and a second terminal, where both the first terminal and the second terminal are equipped with a sensor and a first magnet.

When the first terminal and the second terminal are mutually approaching, the first magnet of the first terminal triggers the sensor of the second terminal, and the sensor of the second terminal generates an output signal. The first magnet of the second terminal triggers the sensor of the first terminal, and the sensor of the first terminal generates an output signal.

The first terminal is configured to acquire the output signal of the sensor of the first terminal, determine the output signal of the sensor of the first terminal as a low-level output signal, send a network access request to a preset server, and determine, according to a network accessed by the first terminal, to perform data transmission with the second terminal.

The second terminal is configured to acquire the output signal of the sensor of the second terminal, determine the output signal of the sensor of the second terminal as a low-level output signal, send a network access request to the preset server, and determine, according to a network accessed by the second terminal, to perform data transmission with the first terminal.

In the system disclosed in this embodiment, the first terminal performs data transmission with the second terminal using a wireless network, which can ensure that relatively large data is transmitted between the first terminal and the second terminal.

Another embodiment of the present disclosure further discloses a data transmission system, including a first terminal and a second terminal, where both the first terminal and the second terminal are equipped with a sensor and a first magnet.

Furthermore, when the first terminal and the second terminal are mutually approaching, a pole N of the first magnet of the first terminal triggers the sensor of the second terminal, and the sensor of the second terminal generates an output signal. A pole N of the first magnet of the second terminal triggers the sensor of the first terminal, and the sensor of the first terminal generates an output signal.

The first terminal is configured to acquire the output signal of the sensor of the first terminal, determine the output signal of the sensor of the first terminal as a low-level output signal, determine that the low-level output signal of the sensor of the first terminal meets a first preset requirement, establish a communication link with the second terminal, and determine, according to the communication link established by the first terminal with the second terminal, to perform data transmission with the second terminal, where the first preset requirement is that a pole N of the first magnet of the second terminal triggers the sensor of the first terminal to generate the low-level output signal.

The second terminal is configured to acquire the output signal of the sensor of the second terminal, determine the output signal of the sensor of the second terminal as a low-level output signal, determine that the low-level output signal of the sensor of the second terminal meets a third preset requirement, and determine, according to a communication link established by the second terminal with the first terminal, to perform data transmission with the first terminal, where the third preset requirement is that a pole N of the first magnet of the first terminal triggers the sensor of the second terminal to generate the low-level output signal and establish the communication link with the first terminal.

For a specific data transmission process of a first terminal and a second terminal in the data transmission system disclosed in this embodiment, refer to the embodiment corresponding to FIG. 6, and details are not described herein again.

Another embodiment of the present disclosure further discloses a data transmission system, including a first terminal and a second terminal, where both the first terminal and the second terminal are equipped with a sensor and a first magnet.

Furthermore, when the first terminal and the second terminal are mutually approaching, a pole S of the first magnet of the first terminal triggers the sensor of the second terminal, and the sensor of the second terminal generates an output signal. A pole S of the first magnet of the second terminal triggers the sensor of the first terminal, and the sensor of the first terminal generates an output signal.

The first terminal is configured to acquire the output signal of the sensor of the first terminal, determine the output signal of the sensor of the first terminal as a low-level output signal, determine that the low-level output signal of the sensor of the first terminal meets a second preset requirement, establish a communication link with the second terminal, and determine, according to the communication link established by the first terminal with the second terminal, to perform data transmission with the second terminal, where the second preset requirement is that a pole S of the first magnet of the second terminal triggers the sensor of the first terminal to generate the low-level output signal.

The second terminal is configured to acquire the output signal of the sensor of the second terminal, determine the output signal of the sensor of the second terminal as a low-level output signal, determine that the low-level output signal of the sensor of the second terminal meets a fourth preset requirement, and determine, according to a communication link established by the second terminal with the first terminal, to perform data transmission with the first terminal, where the fourth preset requirement is that a pole S of the first magnet of the first terminal triggers the sensor of the second terminal to generate the low-level output signal and establish the communication link with the first terminal.

For a specific data transmission process of a first terminal and a second terminal in the data transmission system disclosed in this embodiment, refer to the embodiment corresponding to FIG. 9, and details are not described herein again.

Another embodiment of the present disclosure further discloses a data transmission system, including a first terminal and a second terminal, where both the first terminal and the second terminal are equipped with a sensor, a first magnet, and a second magnet. The second magnet of the first terminal is disposed on a jacket of the first terminal, and the second magnet of the second terminal is disposed on a jacket of the second terminal.

When the first terminal and the second terminal are mutually approaching, the first magnet of the first terminal triggers the sensor of the second terminal, and the sensor of the second terminal generates an output signal. The first magnet of the second terminal triggers the sensor of the first terminal, and the sensor of the first terminal generates an output signal.

The sensor of the first terminal is further configured to be triggered by the second magnet of the first terminal to generate the output signal, and the sensor of the second terminal is further configured to be triggered by the second magnet of the second terminal to generate the output signal.

Furthermore, when the jacket of the first terminal is closed, the second magnet of the first terminal approaches the sensor of the first terminal, and the sensor of the first terminal generates a low-level output signal, when the jacket of the second terminal is closed, the second magnet of the second terminal approaches the sensor of the first terminal, and the sensor of the first terminal generates the low-level output signal.

In addition to being configured to acquire the output signal of the sensor of the first terminal, determine the output signal of the sensor of the first terminal as a low-level output signal, determine that the low-level output signal of the sensor of the first terminal meets a second preset requirement, establish a communication link with the second terminal, and determine, according to the communication link established by the first terminal with the second terminal, to perform data transmission with the second terminal, the first terminal is further configured to determine that the low-level output signal of the sensor of the first terminal does not meet the second preset requirement, determine that the low-level output signal of the sensor of the first terminal meets a fifth preset requirement, and control a screen of the first terminal to enter a screen locking state.

The second preset requirement is that a pole S of the first magnet of the second terminal triggers the sensor of the first terminal to generate the low-level output signal. The fifth preset requirement is that the second magnet of the first terminal triggers, when approaching the sensor of the first terminal because the jacket of the first terminal is closed, the sensor of the first terminal to generate the low-level output signal.

In addition to being configured to acquire the output signal of the sensor of the second terminal, determine the output signal of the sensor of the second terminal as a low-level output signal, determine that the low-level output signal of the sensor of the second terminal meets a fourth preset requirement, and determine, according to a communication link established by the second terminal with the first terminal, to perform data transmission with the first terminal, the second terminal is further configured to determine that the low-level output signal of the sensor of the second terminal does not meet the fourth preset requirement, determine that the low-level output signal of the sensor of the second terminal meets a sixth preset requirement, and control a screen of the second terminal to enter a screen locking state.

The fourth preset requirement is that a pole S of the first magnet of the first terminal triggers the sensor of the second terminal to generate the low-level output signal and establish the communication link with the first terminal.

The sixth preset requirement is that the second magnet of the second terminal triggers, when approaching the sensor of the second terminal because the jacket of the second terminal is closed, the sensor of the second terminal to generate the low-level output signal.

Preferably, another embodiment of the present disclosure further discloses a data transmission system, including a first terminal and a second terminal, where both the first terminal and the second terminal are equipped with a sensor, a first magnet, and a second magnet. The second magnet of the first terminal is disposed on a jacket of the first terminal, and the second magnet of the second terminal is disposed on a jacket of the second terminal.

This embodiment differs from the foregoing embodiments in that the first terminal is further configured to determine an output signal of the sensor of the first terminal as a first high-level output signal, control a screen of the first terminal to enter a screen unlocking state, where the first high-level output signal is a signal generated by triggering the sensor of the first terminal when the second magnet of the first terminal is far from the sensor of the first terminal because the jacket of the first terminal is open.

Similarly, the second terminal is further configured to determine an output signal of the sensor of the second terminal as a second high-level output signal, control a screen of the second terminal to enter a screen unlocking state, where the second high-level output signal is a signal generated by triggering the sensor of the second terminal when the second magnet of the second terminal is far from the sensor of the second terminal because the jacket of the second terminal is open.

For a data transmission process of a first terminal and a second terminal in the data transmission system disclosed in this embodiment of the present disclosure, refer to the foregoing embodiment, and details are not described herein again.

In the end, it should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion such that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

The embodiments in this specification are all described in a progressive manner, for same or similar parts in the embodiments, reference may be made to these embodiments, and each embodiment focuses on a difference from other embodiments.

In combination with the embodiments disclosed in this specification, method or algorithm steps may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a compact disc read-only memory (CD-ROM), or any other form of storage medium known in the art.

The embodiments disclosed above are described to enable a person skilled in the art to implement or use the present disclosure. Various modifications to the embodiments are obvious to the person skilled in the art, and general principles defined in this specification may be implemented in other embodiments without departing from the spirit or scope of the present disclosure. Therefore, the present disclosure will not be limited to the embodiments described in this specification but extends to the widest scope that complies with the principles and novelty disclosed in this specification.

What is claimed is:

1. A data transmission method, comprising: acquiring, by a first terminal, an output signal of a sensor of the first terminal, wherein the output signal of the sensor of the first terminal is a signal generated when a first magnet of a second terminal triggers the sensor of the first terminal; determining, by the first terminal, the output signal of the sensor of the first terminal as a low-level output signal; establishing, by the first terminal, a first communication link with the second terminal when the output signal of the sensor of the first terminal is the low-level output signal; and determining, by the first terminal according to the first communication link established by the first terminal with the second terminal, to perform data transmission with the second terminal, wherein the first terminal further comprises a second magnet disposed on a jacket of the first terminal, wherein the jacket is configured to hold and cover the first terminal, wherein the jacket can be removed from the first terminal, wherein before establishing, by the first terminal, the first communication link with the second terminal, the method further comprises: triggering, by the second magnet of the first terminal, the sensor of the first terminal to generate the low-level output signal when the second magnet approaches the sensor of the first terminal and when the first magnet of the second terminal does not trigger the sensor of the first terminal to generate a low-level output signal; and controlling, by the first terminal, a screen of the first terminal to enter a screen locking state.

2. The method according to claim 1, further comprising: determining, by the first terminal, that the low-level output signal of the sensor of the first terminal does not meet a first preset requirement, wherein the first preset requirement is that a pole S of the first magnet of the second terminal triggers the sensor of the first terminal to generate the low-level output signal;

determining, by the first terminal, that the low-level output signal of the sensor of the first terminal meets a second preset requirement, wherein the second preset requirement is that the second magnet of the first terminal triggers the sensor of the first terminal to generate the low-level output signal when approaching the sensor of the first terminal because the jacket of the first terminal is closed; and controlling, by the first terminal, a screen of the first terminal to enter a screen locking state when the low-level output signal of the sensor of the first terminal meets the second preset requirement.

3. The method according to claim 1, wherein after acquiring, by the first terminal, the output signal of the sensor of the first terminal, the method further comprises:

determining, by the first terminal, the output signal of the sensor of the first terminal as a high-level output signal, wherein the high-level output signal is another signal generated by triggering the sensor of the first terminal when the second magnet of the first terminal is far from the sensor of the first terminal because the jacket of the first terminal is open; and controlling, by the first terminal, a screen of the first terminal to enter a screen unlocking state.

4. A terminal, comprising: a first magnet; a sensor; a processor; and a memory, wherein the first magnet, the sensor, the processor and the memory are in communication with each other, wherein the sensor is configured to be triggered by another first magnet of a second terminal to generate an output signal, wherein the memory is configured to store a program, and wherein the processor is configured to: execute the program stored by the memory; acquire the output signal of the sensor; determine the output signal of the sensor as a low-level output signal; control the terminal to establish a first communication link with the second terminal when the output signal of the sensor is the low-level output signal; and control, according to the first communication link established by the terminal with the second terminal, the terminal to perform data transmission with the second terminal, wherein the terminal further comprises a second magnet disposed on a jacket of the terminal, wherein the jacket is configured to hold and cover the terminal, wherein the jacket can be removed from the terminal, wherein before controlling the terminal to establish the first communication link with the second terminal, the processor is further configured to: trigger the sensor of the terminal to generate the low-level output signal when the second magnet approaches the sensor of the terminal and when the first magnet of the second terminal does not trigger the sensor of the terminal to generate a low-level output signal; and control a screen of the terminal to enter a screen locking state.

5. The terminal according to claim 4, wherein the processor is further configured to:

determine that the low-level output signal of the sensor of the terminal does not meet a first preset requirement, wherein the first preset requirement is that a pole S of the first magnet of the second terminal triggers the sensor of the terminal to generate the low-level output signal;

determine that the low-level output signal of the sensor of the terminal meets a second preset requirement, wherein the second preset requirement is that the second magnet of the terminal triggers the sensor of the terminal to generate the low-level output signal when approaching the sensor of the terminal because the jacket of the terminal is closed; and control a screen of the terminal to enter a screen locking state when the low-level output signal of the sensor of the terminal meets the second preset requirement.

6. The terminal according to claim 4, wherein the processor is further configured to:

determine the output signal of the sensor of the terminal as a high-level output signal, wherein the high-level output signal is another signal generated by triggering the sensor of the terminal when the second magnet of the terminal is far from the sensor of the terminal because the jacket of the terminal is open; and control a screen of the terminal to enter a screen unlocking state.

7. A data transmission system, comprising: a first terminal; and a second terminal in communication with the first terminal, wherein both the first terminal and the second terminal are equipped with a sensor and a first magnet, wherein the first terminal is configured to: acquire an output signal of the sensor of the first terminal, wherein the output signal of the sensor of the first terminal is a signal generated when the first magnet of the second terminal triggers the sensor of the first terminal; determine the output signal of the sensor of the first terminal as a low-level output signal; establish a first communication link with the second terminal; determine, according to the first communication link established by the first terminal with the second terminal, to perform data transmission with the second terminal, wherein the first terminal further comprises a second magnet disposed on a jacket of the first terminal, wherein the jacket is configured to hold and cover the first terminal, wherein the jacket can be removed from the first terminal, wherein before the first terminal establishes the first communication link with the second terminal, the first terminal is further configured to: trigger, by the second magnet of the first terminal, the sensor of the first terminal to generate the low-level output signal when the second magnet approaches the sensor of the first terminal and when the first magnet of the second terminal does not trigger the sensor of the first terminal to generate a low-level output signal; and control a screen of the first terminal to enter a screen locking state, and wherein the second terminal is configured to: acquire an output signal of the sensor of the second terminal, wherein the output signal of the sensor of the second terminal is a signal generated when the first magnet of the first terminal triggers the sensor of the second terminal; determine the output signal of the sensor of the second terminal as the low-level output signal; establish a second communication link with the first terminal; and determine, according to the second communication link established by the second terminal with the first terminal, to perform data transmission with the first terminal.

8. The system according to claim 7, wherein a manner in which the first terminal establishing the first communication link with the second terminal comprises sending, by the first terminal, a BLUETOOTH connection request to the second terminal; and wherein a manner in which the second terminal establishing the second communication link with the first terminal comprises:

receiving, by the second terminal, the BLUETOOTH connection request sent by the first terminal; and responding to, by the second terminal, the BLUETOOTH connection request sent by the first terminal.

9. The system according to claim 8, wherein the first terminal is further configured to:
acquire a storage space occupancy value of to-be-transmitted data, wherein the to-be-transmitted data is obtained when the first terminal determines to perform the data transmission with the second terminal;
determine that the storage space occupancy value is greater than a preset threshold; and
send a network access request to a preset server,
wherein the first terminal determining, according to the first communication link established by the first terminal with the second terminal, to perform the data transmission with the second terminal comprises performing, by the first terminal in a manner of forwarding to-be-transmitted data to the second terminal using the preset server, the data transmission with the second terminal,
wherein the second terminal is further configured to send a network access request to the preset server when the first terminal determines that the storage space occupancy value is greater than the preset threshold, and
wherein the second terminal determining, according to the second communication link established by the second terminal with the first terminal, to perform the data transmission with the first terminal comprises performing, by the second terminal in a manner of forwarding to-be-transmitted data to the first terminal using the preset server, the data transmission with the first terminal.

10. The system according to claim 8, wherein the second terminal is further configured to:
acquire a storage space occupancy value of to-be-transmitted data, wherein the to-be-transmitted data is obtained when the second terminal determines to perform the data transmission with the first terminal;
determine that the storage space occupancy value is greater than a preset threshold; and send a network access request to a preset server,
wherein the second terminal determines, according to the second communication link established by the second terminal with the first terminal, to perform the data transmission with the first terminal comprises performing, by the second terminal in a manner of forwarding to-be-transmitted data to the first terminal using the preset server, the data transmission with the first terminal,
wherein the first terminal is further configured to send a network access request to the preset server when the second terminal determine that the storage space occupancy value is greater than the preset threshold, and
wherein the first terminal determines, according to the first communication link established by the first terminal with the second terminal, to perform the data transmission with the second terminal comprises performing, by the first terminal in a manner of forwarding to-be-transmitted data to the second terminal by the preset server, the data transmission with the second terminal.

11. The system according to claim 7, wherein a manner in which the second terminal establishing the second communication link with the first terminal comprises sending, by the second terminal, a BLUETOOTH connection request to the first terminal; and
wherein a manner in which the first terminal establishes the first communication link with the second terminal comprises:
receiving, by the first terminal, the BLUETOOTH connection request sent by the second terminal; and
responding to, by the first terminal, the BLUETOOTH connection request sent by the second terminal.

12. The system according to claim 7, wherein a manner in which the first terminal establishes the first communication link with the second terminal comprises sending, by the first terminal, a network access request to a preset server; and
wherein a manner in which the second terminal establishes the second communication link with the first terminal comprises sending, by the second terminal, another network access request to the preset server.

13. The system according to claim 7, wherein before establishing the second communication link with the first terminal, the second terminal is further configured to determine that the low-level output signal of the sensor of the second terminal meets a first preset requirement, and wherein the first preset requirement is that a pole N of the first magnet of the first terminal triggers the sensor of the second terminal to generate the low-level output signal.

14. The system according to claim 7, wherein before establishing the second communication link with the first terminal, the second terminal is further configured to determine that the low-level output signal of the sensor of the second terminal meets a second preset requirement, and wherein the second preset requirement is that a pole S of the first magnet of the first terminal triggers the sensor of the second terminal to generate the low-level output signal.

* * * * *